US009643144B2

(12) United States Patent
Xu et al.

(10) Patent No.: US 9,643,144 B2
(45) Date of Patent: May 9, 2017

(54) METHOD TO GENERATE AND DISPERSE NANOSTRUCTURES IN A COMPOSITE MATERIAL

(75) Inventors: Zhiyue Xu, Cypress, TX (US); Gaurav Agrawal, Aurora, CO (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1055 days.

(21) Appl. No.: 13/224,443

(22) Filed: Sep. 2, 2011

(65) Prior Publication Data
US 2013/0059074 A1   Mar. 7, 2013

(51) Int. Cl.
| | | |
|---|---|---|
| B05D 7/00 | (2006.01) |
| B01J 2/00 | (2006.01) |
| B22F 1/02 | (2006.01) |
| B01J 2/16 | (2006.01) |
| C08J 5/00 | (2006.01) |

(52) U.S. Cl.
CPC ............... *B01J 2/006* (2013.01); *B01J 2/16* (2013.01); *B22F 1/02* (2013.01); *B22F 1/025* (2013.01); *C08J 5/005* (2013.01); *B22F 2202/15* (2013.01); *C08J 2323/06* (2013.01); *C08J 2323/12* (2013.01); *C08J 2325/02* (2013.01); *C08J 2325/18* (2013.01); *C08J 2333/02* (2013.01); *C08J 2333/12* (2013.01); *C08J 2335/04* (2013.01); *C08J 2361/16* (2013.01)

(58) Field of Classification Search
CPC ................ B22F 7/02; B01J 2/16; C08J 5/005
See application file for complete search history.

(56) References Cited

U.S. PATENT DOCUMENTS

| 1,468,905 A | 9/1923 | Herman |
|---|---|---|
| 2,189,697 A | 2/1940 | Baker |
| (Continued) | | |

FOREIGN PATENT DOCUMENTS

| CA | 2783241 A1 | 6/2011 |
|---|---|---|
| CA | 2783346 A1 | 6/2011 |
| (Continued) | | |

OTHER PUBLICATIONS

M.S. Senthil Saravanan et al., "Mechanically Alloyed Carbon Nanotubes (CNT) Reinforced Nanocrystalline AA 4032: Synthesis and Characterization," Journal of Minerals & Materials Characterization & Engineering, vol. 9, No. 11, pp. 1027-1035, 2010.
(Continued)

*Primary Examiner* — Jessee Roe
*Assistant Examiner* — Christopher Kessler
(74) *Attorney, Agent, or Firm* — Cantor Colburn LLP (57) ABSTRACT

A method of making a nanostructure-reinforced composite comprises providing matrix particles in a reactor; fluidizing the matrix particles; introducing a nanostructure material into the reactor; homogeneously dispersing the nanostructure material; uniformly depositing the nanostructure material on the matrix particles to form a composite powder; generating a nanostructure on the matrix particles from the nanostructure material; and processing the composite powder to form the nanostructure-reinforced composite having a matrix formed from the matrix particles. The nanostructures are evenly distributed in the matrix of the nanostructure-reinforced composite.

11 Claims, 2 Drawing Sheets

(56) References Cited

U.S. PATENT DOCUMENTS

| | | |
|---|---|---|
| 2,222,233 A | 11/1940 | Mize |
| 2,225,143 A | 12/1940 | Baker |
| 2,238,895 A | 4/1941 | Gage |
| 2,261,292 A | 11/1941 | Salnikov |
| 2,294,648 A | 9/1942 | Ansel |
| 2,301,624 A | 11/1942 | Holt |
| 2,352,993 A | 7/1944 | Albertson |
| 2,394,843 A | 2/1946 | Cooke et al. |
| 2,672,199 A | 3/1948 | McKenna |
| 2,753,941 A | 7/1956 | Hebard et al. |
| 2,754,910 A | 7/1956 | Derrick et al. |
| 2,933,136 A | 4/1960 | Ayers et al. |
| 2,983,634 A | 5/1961 | Budininkas et al. |
| 3,057,405 A | 10/1962 | Mallinger |
| 3,066,391 A | 12/1962 | Vordahl |
| 3,106,959 A | 10/1963 | Huitt et al. |
| 3,142,338 A | 7/1964 | Brown |
| 3,152,009 A | 10/1964 | DeLong |
| 3,196,949 A | 7/1965 | Thomas |
| 3,242,988 A | 3/1966 | McGuire et al. |
| 3,316,748 A | 5/1967 | Lang et al. |
| 3,326,291 A | 6/1967 | Zandmer et al. |
| 3,347,317 A | 10/1967 | Zandemer |
| 3,347,714 A | 10/1967 | Broverman et al. |
| 3,390,724 A | 7/1968 | Caldwell |
| 3,395,758 A | 8/1968 | Kelly et al. |
| 3,406,101 A | 10/1968 | Kilpatrick |
| 3,416,918 A | 12/1968 | Henry |
| 3,434,537 A | 3/1969 | Zandmer |
| 3,465,181 A | 9/1969 | Colby et al. |
| 3,489,218 A | 1/1970 | Means |
| 3,513,230 A | 5/1970 | Rhees et al. |
| 3,602,305 A | 8/1971 | Kisling |
| 3,637,446 A | 1/1972 | Elliott et al. |
| 3,645,331 A | 2/1972 | Maurer et al. |
| 3,660,049 A | 5/1972 | Benjamin |
| 3,765,484 A | 10/1973 | Hamby, Jr. et al. |
| 3,768,563 A | 10/1973 | Blount |
| 3,775,823 A | 12/1973 | Adolph et al. |
| 3,816,080 A | 6/1974 | Bomford et al. |
| 3,878,889 A | 4/1975 | Seabourn |
| 3,894,850 A | 7/1975 | Kovalchuk et al. |
| 3,924,677 A | 12/1975 | Prenner et al. |
| 4,010,583 A | 3/1977 | Highberg |
| 4,039,717 A | 8/1977 | Titus |
| 4,050,529 A | 9/1977 | Tagirov et al. |
| 4,157,732 A | 6/1979 | Fonner |
| 4,248,307 A | 2/1981 | Silberman et al. |
| 4,284,137 A | 8/1981 | Taylor |
| 4,292,377 A | 9/1981 | Petersen et al. |
| 4,372,384 A | 2/1983 | Kinney |
| 4,373,584 A | 2/1983 | Silberman et al. |
| 4,373,952 A | 2/1983 | Parent |
| 4,374,543 A | 2/1983 | Richardson |
| 4,384,616 A | 5/1983 | Dellinger |
| 4,395,440 A | 7/1983 | Abe et al. |
| 4,399,871 A | 8/1983 | Adkins et al. |
| 4,407,368 A | 10/1983 | Erbstoesser |
| 4,422,508 A | 12/1983 | Rutledge, Jr. et al. |
| 4,452,311 A | 6/1984 | Speegle et al. |
| 4,475,729 A | 10/1984 | Costigan |
| 4,498,543 A | 2/1985 | Pye et al. |
| 4,499,048 A | 2/1985 | Hanejko |
| 4,499,049 A | 2/1985 | Hanejko |
| 4,524,825 A | 6/1985 | Fore |
| 4,526,840 A | 7/1985 | Jerabek |
| 4,534,414 A | 8/1985 | Pringle |
| 4,539,175 A | 9/1985 | Lichti et al. |
| 4,554,986 A | 11/1985 | Jones |
| 4,619,699 A | 10/1986 | Petkovic-Luton et al. |
| 4,640,354 A | 2/1987 | Boisson |
| 4,664,962 A | 5/1987 | DesMarais, Jr. |
| 4,668,470 A | 5/1987 | Gilman et al. |
| 4,673,549 A | 6/1987 | Ecer |
| 4,674,572 A | 6/1987 | Gallus |
| 4,678,037 A | 7/1987 | Smith |
| 4,681,133 A | 7/1987 | Weston |
| 4,688,641 A | 8/1987 | Knieriemen |
| 4,690,796 A | 9/1987 | Paliwal |
| 4,693,863 A | 9/1987 | Del Corso et al. |
| 4,703,807 A | 11/1987 | Weston |
| 4,706,753 A | 11/1987 | Ohkochi et al. |
| 4,708,202 A | 11/1987 | Sukup et al. |
| 4,708,208 A | 11/1987 | Halbardier |
| 4,709,761 A | 12/1987 | Setterberg, Jr. |
| 4,714,116 A | 12/1987 | Brunner |
| 4,716,964 A | 1/1988 | Erbstoesser et al. |
| 4,719,971 A | 1/1988 | Owens |
| 4,721,159 A | 1/1988 | Ohkochi et al. |
| 4,738,599 A | 4/1988 | Shilling |
| 4,741,973 A | 5/1988 | Condit et al. |
| 4,768,588 A | 9/1988 | Kupsa |
| 4,775,598 A | 10/1988 | Jaeckel |
| 4,784,226 A | 11/1988 | Wyatt |
| 4,805,699 A | 2/1989 | Halbardier |
| 4,817,725 A | 4/1989 | Jenkins |
| 4,834,184 A | 5/1989 | Streich et al. |
| H635 H | 6/1989 | Johnson et al. |
| 4,850,432 A | 7/1989 | Porter et al. |
| 4,853,056 A | 8/1989 | Hoffman |
| 4,869,324 A | 9/1989 | Holder |
| 4,869,325 A | 9/1989 | Halbardier |
| 4,880,059 A | 11/1989 | Brandell et al. |
| 4,889,187 A | 12/1989 | Terrell et al. |
| 4,890,675 A | 1/1990 | Dew |
| 4,901,794 A | 2/1990 | Baugh |
| 4,909,320 A | 3/1990 | Hebert et al. |
| 4,929,415 A | 5/1990 | Okazaki |
| 4,932,474 A | 6/1990 | Schroeder, Jr. et al. |
| 4,938,309 A | 7/1990 | Emdy |
| 4,938,809 A | 7/1990 | Das et al. |
| 4,944,351 A | 7/1990 | Eriksen et al. |
| 4,949,788 A | 8/1990 | Szarka et al. |
| 4,952,902 A | 8/1990 | Kawaguchi et al. |
| 4,975,412 A | 12/1990 | Okazaki et al. |
| 4,977,958 A | 12/1990 | Miller |
| 4,981,177 A | 1/1991 | Carmody et al. |
| 4,986,361 A | 1/1991 | Mueller et al. |
| 4,997,622 A | 3/1991 | Regazzoni et al. |
| 5,006,044 A | 4/1991 | Walker, Sr. et al. |
| 5,010,955 A | 4/1991 | Springer |
| 5,036,921 A | 8/1991 | Pittard et al. |
| 5,048,611 A | 9/1991 | Cochran |
| 5,049,165 A | 9/1991 | Tselesin |
| 5,061,323 A | 10/1991 | DeLuccia |
| 5,063,775 A | 11/1991 | Walker, Sr. et al. |
| 5,073,207 A | 12/1991 | Faure et al. |
| 5,074,361 A | 12/1991 | Brisco et al. |
| 5,076,869 A | 12/1991 | Bourell et al. |
| 5,084,088 A | 1/1992 | Okazaki |
| 5,087,304 A | 2/1992 | Chang et al. |
| 5,090,480 A | 2/1992 | Pittard et al. |
| 5,095,988 A | 3/1992 | Bode |
| 5,103,911 A | 4/1992 | Heijnen |
| 5,117,915 A | 6/1992 | Mueller et al. |
| 5,161,614 A | 11/1992 | Wu et al. |
| 5,171,734 A * | 12/1992 | Sanjurjo et al. ............... 505/447 |
| 5,178,216 A | 1/1993 | Giroux et al. |
| 5,181,571 A | 1/1993 | Mueller et al. |
| 5,183,631 A | 2/1993 | Kugimiya et al. |
| 5,188,182 A | 2/1993 | Echols, III et al. |
| 5,188,183 A | 2/1993 | Hopmann et al. |
| 5,204,055 A | 4/1993 | Sachs et al. |
| 5,222,867 A | 6/1993 | Walker, Sr. et al. |
| 5,226,483 A | 7/1993 | Williamson, Jr. |
| 5,228,518 A | 7/1993 | Wilson et al. |
| 5,234,055 A | 8/1993 | Cornette |
| 5,252,365 A | 10/1993 | White |
| 5,253,714 A | 10/1993 | Davis et al. |
| 5,271,468 A | 12/1993 | Streich et al. |
| 5,282,509 A | 2/1994 | Schurr, III |
| 5,292,478 A | 3/1994 | Scorey |
| 5,293,940 A | 3/1994 | Hromas et al. |
| 5,304,260 A | 4/1994 | Aikawa et al. |

(56) References Cited

U.S. PATENT DOCUMENTS

| | | |
|---|---|---|
| 5,304,588 A | 4/1994 | Boysen et al. |
| 5,309,874 A | 5/1994 | Willermet et al. |
| 5,310,000 A | 5/1994 | Arterbury et al. |
| 5,316,598 A | 5/1994 | Chang et al. |
| 5,318,746 A | 6/1994 | Lashmore |
| 5,352,522 A | 10/1994 | Kugimiya et al. |
| 5,380,473 A | 1/1995 | Bogue et al. |
| 5,387,380 A | 2/1995 | Cima et al. |
| 5,392,860 A | 2/1995 | Ross |
| 5,394,236 A | 2/1995 | Murnick |
| 5,394,941 A | 3/1995 | Venditto et al. |
| 5,398,754 A | 3/1995 | Dinhoble |
| 5,407,011 A | 4/1995 | Layton |
| 5,409,555 A | 4/1995 | Fujita et al. |
| 5,411,082 A | 5/1995 | Kennedy |
| 5,417,285 A | 5/1995 | Van Buskirk et al. |
| 5,425,424 A | 6/1995 | Reinhardt et al. |
| 5,427,177 A | 6/1995 | Jordan, Jr. et al. |
| 5,435,392 A | 7/1995 | Kennedy |
| 5,439,051 A | 8/1995 | Kennedy et al. |
| 5,454,430 A | 10/1995 | Kennedy et al. |
| 5,456,317 A | 10/1995 | Hood, III et al. |
| 5,456,327 A | 10/1995 | Denton et al. |
| 5,464,062 A | 11/1995 | Blizzard, Jr. |
| 5,472,048 A | 12/1995 | Kennedy et al. |
| 5,474,131 A | 12/1995 | Jordan, Jr. et al. |
| 5,477,923 A | 12/1995 | Jordan, Jr. et al. |
| 5,479,986 A | 1/1996 | Gano et al. |
| 5,506,055 A | 4/1996 | Dorfman et al. |
| 5,507,439 A | 4/1996 | Story |
| 5,511,620 A | 4/1996 | Baugh et al. |
| 5,524,699 A | 6/1996 | Cook |
| 5,526,880 A | 6/1996 | Jordan, Jr. et al. |
| 5,526,881 A | 6/1996 | Martin et al. |
| 5,529,746 A | 6/1996 | Knoss et al. |
| 5,533,573 A | 7/1996 | Jordan, Jr. et al. |
| 5,536,485 A | 7/1996 | Kume et al. |
| 5,558,153 A | 9/1996 | Holcombe et al. |
| 5,601,924 A | 2/1997 | Beane |
| 5,607,017 A | 3/1997 | Owens et al. |
| 5,623,993 A | 4/1997 | Van Buskirk et al. |
| 5,623,994 A | 4/1997 | Robinson |
| 5,636,691 A | 6/1997 | Hendrickson et al. |
| 5,641,023 A | 6/1997 | Ross et al. |
| 5,647,444 A | 7/1997 | Williams |
| 5,665,289 A | 9/1997 | Chung et al. |
| 5,677,372 A | 10/1997 | Yamamoto et al. |
| 5,685,372 A | 11/1997 | Gano |
| 5,701,576 A | 12/1997 | Fujita et al. |
| 5,707,214 A | 1/1998 | Schmidt |
| 5,709,269 A | 1/1998 | Head |
| 5,720,344 A | 2/1998 | Newman |
| 5,728,195 A | 3/1998 | Eastman et al. |
| 5,765,639 A | 6/1998 | Muth |
| 5,772,735 A | 6/1998 | Sehgal et al. |
| 5,782,305 A | 7/1998 | Hicks |
| 5,797,454 A | 8/1998 | Hipp |
| 5,826,652 A | 10/1998 | Tapp |
| 5,826,661 A | 10/1998 | Parker et al. |
| 5,829,520 A | 11/1998 | Johnson |
| 5,836,396 A | 11/1998 | Norman |
| 5,857,521 A | 1/1999 | Ross et al. |
| 5,881,816 A | 3/1999 | Wright |
| 5,896,819 A | 4/1999 | Turila et al. |
| 5,902,424 A | 5/1999 | Fujita et al. |
| 5,934,372 A | 8/1999 | Muth |
| 5,941,309 A | 8/1999 | Appleton |
| 5,960,881 A | 10/1999 | Allamon et al. |
| 5,985,466 A | 11/1999 | Atarashi et al. |
| 5,988,287 A | 11/1999 | Jordan, Jr. et al. |
| 5,990,051 A | 11/1999 | Ischy et al. |
| 5,992,452 A | 11/1999 | Nelson, II |
| 5,992,520 A | 11/1999 | Schultz et al. |
| 6,007,314 A | 12/1999 | Nelson, II |
| 6,024,915 A * | 2/2000 | Kume et al. .................. 419/48 |
| 6,032,735 A | 3/2000 | Echols |
| 6,036,777 A | 3/2000 | Sachs |
| 6,047,773 A | 4/2000 | Zeltmann et al. |
| 6,050,340 A | 4/2000 | Scott |
| 6,069,313 A | 5/2000 | Kay |
| 6,076,600 A | 6/2000 | Vick, Jr. et al. |
| 6,079,496 A | 6/2000 | Hirth |
| 6,085,837 A | 7/2000 | Massinon et al. |
| 6,095,247 A | 8/2000 | Streich et al. |
| 6,119,783 A | 9/2000 | Parker et al. |
| 6,142,237 A | 11/2000 | Christmas et al. |
| 6,161,622 A | 12/2000 | Robb |
| 6,167,970 B1 | 1/2001 | Stout et al. |
| 6,170,583 B1 | 1/2001 | Boyce |
| 6,173,779 B1 | 1/2001 | Smith |
| 6,176,323 B1 | 1/2001 | Weirich et al. |
| 6,189,616 B1 | 2/2001 | Gano et al. |
| 6,189,618 B1 | 2/2001 | Beeman et al. |
| 6,213,202 B1 | 4/2001 | Read, Jr. |
| 6,220,350 B1 | 4/2001 | Brothers et al. |
| 6,220,357 B1 | 4/2001 | Carmichael et al. |
| 6,228,904 B1 | 5/2001 | Yadav et al. |
| 6,237,688 B1 | 5/2001 | Burleson et al. |
| 6,238,280 B1 | 5/2001 | Ritt et al. |
| 6,241,021 B1 | 6/2001 | Bowling |
| 6,248,399 B1 | 6/2001 | Hehmann |
| 6,250,392 B1 | 6/2001 | Muth |
| 6,261,432 B1 | 7/2001 | Huber et al. |
| 6,273,187 B1 | 8/2001 | Voisin, Jr. et al. |
| 6,276,452 B1 | 8/2001 | Davis et al. |
| 6,276,457 B1 | 8/2001 | Moffatt et al. |
| 6,279,656 B1 | 8/2001 | Sinclair et al. |
| 6,287,445 B1 | 9/2001 | Lashmore et al. |
| 6,302,205 B1 | 10/2001 | Ryll |
| 6,315,041 B1 | 11/2001 | Carlisle et al. |
| 6,315,050 B2 | 11/2001 | Vaynshteyn et al. |
| 6,325,148 B1 | 12/2001 | Trahan et al. |
| 6,328,110 B1 | 12/2001 | Joubert |
| 6,341,653 B1 | 1/2002 | Firmaniuk et al. |
| 6,341,747 B1 | 1/2002 | Schmidt et al. |
| 6,349,766 B1 | 2/2002 | Bussear et al. |
| 6,354,372 B1 | 3/2002 | Carisella et al. |
| 6,354,379 B2 | 3/2002 | Miszewski et al. |
| 6,357,332 B1 | 3/2002 | Vecchio |
| 6,371,206 B1 | 4/2002 | Mills |
| 6,372,346 B1 | 4/2002 | Toth |
| 6,382,244 B2 | 5/2002 | Vann |
| 6,390,195 B1 | 5/2002 | Nguyen et al. |
| 6,390,200 B1 | 5/2002 | Allamon et al. |
| 6,394,180 B1 | 5/2002 | Berscheidt et al. |
| 6,394,185 B1 | 5/2002 | Constien |
| 6,397,950 B1 | 6/2002 | Streich et al. |
| 6,401,547 B1 | 6/2002 | Hatfield et al. |
| 6,403,210 B1 | 6/2002 | Stuivinga et al. |
| 6,408,946 B1 | 6/2002 | Marshall et al. |
| 6,419,023 B1 | 7/2002 | George et al. |
| 6,439,313 B1 | 8/2002 | Thomeer et al. |
| 6,446,717 B1 | 9/2002 | White et al. |
| 6,457,525 B1 | 10/2002 | Scott |
| 6,467,546 B2 | 10/2002 | Allamon et al. |
| 6,470,965 B1 | 10/2002 | Winzer |
| 6,491,097 B1 | 12/2002 | Oneal et al. |
| 6,491,116 B2 | 12/2002 | Berscheidt et al. |
| 6,513,598 B2 | 2/2003 | Moore et al. |
| 6,513,600 B2 | 2/2003 | Ross |
| 6,540,033 B1 | 4/2003 | Sullivan et al. |
| 6,543,543 B2 | 4/2003 | Muth |
| 6,561,275 B2 | 5/2003 | Glass et al. |
| 6,588,507 B2 | 7/2003 | Dusterhoft et al. |
| 6,591,915 B2 | 7/2003 | Burris et al. |
| 6,601,648 B2 | 8/2003 | Ebinger |
| 6,601,650 B2 | 8/2003 | Sundararajan |
| 6,609,569 B2 | 8/2003 | Howlett et al. |
| 6,612,826 B1 | 9/2003 | Bauer et al. |
| 6,613,383 B1 | 9/2003 | George et al. |
| 6,619,400 B2 | 9/2003 | Brunet |
| 6,634,428 B2 | 10/2003 | Krauss et al. |
| 6,662,886 B2 | 12/2003 | Russell |
| 6,675,889 B1 | 1/2004 | Mullins et al. |

(56) References Cited

U.S. PATENT DOCUMENTS

| | | |
|---|---|---|
| 6,699,305 B2 | 3/2004 | Myrick |
| 6,712,153 B2 | 3/2004 | Turley et al. |
| 6,712,797 B1 | 3/2004 | Southern, Jr. |
| 6,713,177 B2 | 3/2004 | George et al. |
| 6,715,541 B2 | 4/2004 | Pedersen et al. |
| 6,719,051 B2 | 4/2004 | Hailey, Jr. et al. |
| 6,755,249 B2 | 6/2004 | Robison et al. |
| 6,769,491 B2 | 8/2004 | Zimmerman |
| 6,776,228 B2 | 8/2004 | Pedersen et al. |
| 6,779,599 B2 | 8/2004 | Mullins et al. |
| 6,799,638 B2 | 10/2004 | Butterfield, Jr. |
| 6,810,960 B2 | 11/2004 | Pia |
| 6,817,414 B2 | 11/2004 | Lee |
| 6,831,044 B2 | 12/2004 | Constien |
| 6,883,611 B2 | 4/2005 | Smith et al. |
| 6,887,297 B2 | 5/2005 | Winter et al. |
| 6,896,049 B2 | 5/2005 | Moyes |
| 6,896,061 B2 | 5/2005 | Hriscu et al. |
| 6,899,176 B2 | 5/2005 | Hailey, Jr. et al. |
| 6,899,777 B2 | 5/2005 | Vaidyanathan et al. |
| 6,908,516 B2 | 6/2005 | Hehmann et al. |
| 6,913,827 B2 | 7/2005 | George et al. |
| 6,926,086 B2 | 8/2005 | Patterson et al. |
| 6,932,159 B2 | 8/2005 | Hovem |
| 6,939,388 B2 | 9/2005 | Angeliu |
| 6,945,331 B2 | 9/2005 | Patel |
| 6,951,331 B2 | 10/2005 | Haughom et al. |
| 6,959,759 B2 | 11/2005 | Doane et al. |
| 6,973,970 B2 | 12/2005 | Johnston et al. |
| 6,973,973 B2 | 12/2005 | Howard et al. |
| 6,983,796 B2 | 1/2006 | Bayne et al. |
| 6,986,390 B2 | 1/2006 | Doane et al. |
| 7,013,989 B2 | 3/2006 | Hammond et al. |
| 7,013,998 B2 | 3/2006 | Ray et al. |
| 7,017,664 B2 | 3/2006 | Walker et al. |
| 7,017,677 B2 | 3/2006 | Keshavan et al. |
| 7,021,389 B2 | 4/2006 | Bishop et al. |
| 7,025,146 B2 | 4/2006 | King et al. |
| 7,028,778 B2 | 4/2006 | Krywitsky |
| 7,044,230 B2 | 5/2006 | Starr et al. |
| 7,049,272 B2 | 5/2006 | Sinclair et al. |
| 7,051,805 B2 | 5/2006 | Doane et al. |
| 7,059,410 B2 | 6/2006 | Bousche et al. |
| 7,090,027 B1 | 8/2006 | Williams |
| 7,093,664 B2 | 8/2006 | Todd et al. |
| 7,096,945 B2 | 8/2006 | Richards et al. |
| 7,096,946 B2 | 8/2006 | Jasser et al. |
| 7,097,807 B1 | 8/2006 | Meeks, III et al. |
| 7,097,906 B2 | 8/2006 | Gardner |
| 7,108,080 B2 | 9/2006 | Tessari et al. |
| 7,111,682 B2 | 9/2006 | Blaisdell |
| 7,128,145 B2 | 10/2006 | Mickey |
| 7,141,207 B2 | 11/2006 | Jandeska, Jr. et al. |
| 7,150,326 B2 | 12/2006 | Bishop et al. |
| 7,163,066 B2 | 1/2007 | Lehr |
| 7,165,622 B2 | 1/2007 | Hirth et al. |
| 7,168,494 B2 | 1/2007 | Starr et al. |
| 7,174,963 B2 | 2/2007 | Bertelsen |
| 7,182,135 B2 | 2/2007 | Szarka |
| 7,188,559 B1 | 3/2007 | Vecchio |
| 7,210,527 B2 | 5/2007 | Walker et al. |
| 7,210,533 B2 | 5/2007 | Starr et al. |
| 7,217,311 B2 | 5/2007 | Hong et al. |
| 7,234,530 B2 | 6/2007 | Gass |
| 7,250,188 B2 | 7/2007 | Dodelet et al. |
| 7,252,162 B2 | 8/2007 | Akinlade et al. |
| 7,255,172 B2 | 8/2007 | Johnson |
| 7,255,178 B2 | 8/2007 | Slup et al. |
| 7,264,060 B2 | 9/2007 | Wills |
| 7,267,172 B2 | 9/2007 | Hofman |
| 7,267,178 B2 | 9/2007 | Krywitsky |
| 7,270,186 B2 | 9/2007 | Johnson |
| 7,287,592 B2 | 10/2007 | Surjaatmadja et al. |
| 7,311,152 B2 | 12/2007 | Howard et al. |
| 7,316,274 B2 | 1/2008 | Xu et al. |
| 7,320,365 B2 | 1/2008 | Pia |
| 7,322,412 B2 | 1/2008 | Badalamenti et al. |
| 7,322,417 B2 | 1/2008 | Rytlewski et al. |
| 7,325,617 B2 | 2/2008 | Murray |
| 7,328,750 B2 | 2/2008 | Swor et al. |
| 7,331,388 B2 | 2/2008 | Vilela et al. |
| 7,337,854 B2 | 3/2008 | Horn et al. |
| 7,346,456 B2 | 3/2008 | Le Bemadjiel |
| 7,350,582 B2 | 4/2008 | McKeachnie et al. |
| 7,353,879 B2 | 4/2008 | Todd et al. |
| 7,360,593 B2 | 4/2008 | Constien |
| 7,360,597 B2 | 4/2008 | Blaisdell |
| 7,363,970 B2 | 4/2008 | Corre et al. |
| 7,373,978 B2 | 5/2008 | Barry et al. |
| 7,384,443 B2 | 6/2008 | Mirchandani |
| 7,387,158 B2 | 6/2008 | Murray et al. |
| 7,387,165 B2 | 6/2008 | Lopez De Cardenas et al. |
| 7,392,841 B2 | 7/2008 | Murray et al. |
| 7,401,648 B2 | 7/2008 | Richard |
| 7,416,029 B2 | 8/2008 | Telfer et al. |
| 7,422,058 B2 | 9/2008 | O'Malley |
| 7,426,964 B2 | 9/2008 | Lynde et al. |
| 7,441,596 B2 | 10/2008 | Wood et al. |
| 7,445,049 B2 | 11/2008 | Howard et al. |
| 7,451,815 B2 | 11/2008 | Hailey, Jr. |
| 7,451,817 B2 | 11/2008 | Reddy et al. |
| 7,461,699 B2 | 12/2008 | Richard et al. |
| 7,464,764 B2 | 12/2008 | Xu |
| 7,472,750 B2 | 1/2009 | Walker et al. |
| 7,478,676 B2 | 1/2009 | East, Jr. et al. |
| 7,503,390 B2 | 3/2009 | Gomez |
| 7,503,399 B2 | 3/2009 | Badalamenti et al. |
| 7,509,993 B1 | 3/2009 | Turng et al. |
| 7,510,018 B2 | 3/2009 | Williamson et al. |
| 7,513,311 B2 | 4/2009 | Gramstad et al. |
| 7,527,103 B2 | 5/2009 | Huang et al. |
| 7,537,825 B1 | 5/2009 | Wardle et al. |
| 7,552,777 B2 | 6/2009 | Murray et al. |
| 7,552,779 B2 | 6/2009 | Murray |
| 7,559,357 B2 | 7/2009 | Clem |
| 7,575,062 B2 | 8/2009 | East, Jr. |
| 7,579,087 B2 | 8/2009 | Maloney et al. |
| 7,591,318 B2 | 9/2009 | Tilghman |
| 7,600,572 B2 | 10/2009 | Slup et al. |
| 7,604,049 B2 | 10/2009 | Vaidya et al. |
| 7,604,055 B2 | 10/2009 | Richard et al. |
| 7,607,476 B2 | 10/2009 | Tom et al. |
| 7,617,871 B2 | 11/2009 | Surjaatmadja et al. |
| 7,635,023 B2 | 12/2009 | Goldberg et al. |
| 7,640,988 B2 | 1/2010 | Phi et al. |
| 7,661,480 B2 | 2/2010 | Al-Anazi |
| 7,661,481 B2 | 2/2010 | Todd et al. |
| 7,665,537 B2 | 2/2010 | Patel et al. |
| 7,686,082 B2 | 3/2010 | Marsh |
| 7,690,436 B2 | 4/2010 | Turley et al. |
| 7,699,101 B2 | 4/2010 | Fripp et al. |
| 7,703,510 B2 | 4/2010 | Xu |
| 7,703,511 B2 | 4/2010 | Buyers et al. |
| 7,708,078 B2 | 5/2010 | Stoesz |
| 7,709,421 B2 | 5/2010 | Jones et al. |
| 7,712,541 B2 | 5/2010 | Loretz et al. |
| 7,723,272 B2 | 5/2010 | Crews et al. |
| 7,726,406 B2 | 6/2010 | Xu |
| 7,735,578 B2 | 6/2010 | Loehr et al. |
| 7,743,836 B2 | 6/2010 | Cook |
| 7,752,971 B2 | 7/2010 | Loehr |
| 7,757,773 B2 | 7/2010 | Rytlewski |
| 7,762,342 B2 | 7/2010 | Richard et al. |
| 7,770,652 B2 | 8/2010 | Barnett |
| 7,771,289 B2 | 8/2010 | Palumbo et al. |
| 7,775,284 B2 | 8/2010 | Richards et al. |
| 7,775,285 B2 | 8/2010 | Surjaatmadja et al. |
| 7,775,286 B2 | 8/2010 | Duphorne |
| 7,784,543 B2 | 8/2010 | Johnson |
| 2,793,820 A1 | 9/2010 | Hirano et al. |
| 7,793,714 B2 | 9/2010 | Johnson |
| 7,798,225 B2 | 9/2010 | Giroux et al. |
| 7,798,226 B2 | 9/2010 | Themig |
| 7,798,236 B2 | 9/2010 | McKeachnie et al. |

(56) References Cited

U.S. PATENT DOCUMENTS

| | | |
|---|---|---|
| 7,806,189 B2 | 10/2010 | Frazier |
| 7,806,192 B2 | 10/2010 | Foster et al. |
| 7,810,553 B2 | 10/2010 | Cruickshank et al. |
| 7,810,567 B2 | 10/2010 | Daniels et al. |
| 7,819,198 B2 | 10/2010 | Birckhead et al. |
| 7,828,055 B2 | 11/2010 | Willauer et al. |
| 7,833,944 B2 | 11/2010 | Munoz et al. |
| 7,849,927 B2 | 12/2010 | Herrera |
| 7,851,016 B2 | 12/2010 | Arbab et al. |
| 7,855,168 B2 | 12/2010 | Fuller et al. |
| 7,861,779 B2 | 1/2011 | Vestavik |
| 7,861,781 B2 | 1/2011 | D'Arcy |
| 7,874,365 B2 | 1/2011 | East, Jr. et al. |
| 7,878,253 B2 | 2/2011 | Stowe et al. |
| 7,896,091 B2 | 3/2011 | Williamson et al. |
| 7,897,063 B1 | 3/2011 | Perry et al. |
| 7,900,696 B1 | 3/2011 | Nish et al. |
| 7,900,703 B2 | 3/2011 | Clark et al. |
| 7,909,096 B2 | 3/2011 | Clark et al. |
| 7,909,104 B2 | 3/2011 | Bjorgum |
| 7,909,110 B2 | 3/2011 | Sharma et al. |
| 7,909,115 B2 | 3/2011 | Grove et al. |
| 7,913,765 B2 | 3/2011 | Crow et al. |
| 7,918,275 B2 | 4/2011 | Clem |
| 7,931,093 B2 | 4/2011 | Foster et al. |
| 7,938,191 B2 | 5/2011 | Vaidya |
| 7,946,335 B2 | 5/2011 | Bewlay et al. |
| 7,946,340 B2 | 5/2011 | Surjaatmadja et al. |
| 7,958,940 B2 | 6/2011 | Jameson |
| 7,963,331 B2 | 6/2011 | Surjaatmadja et al. |
| 7,963,340 B2 | 6/2011 | Gramstad et al. |
| 7,963,342 B2 | 6/2011 | George |
| 7,980,300 B2 | 7/2011 | Roberts et al. |
| 7,987,906 B1 | 8/2011 | Troy |
| 7,992,763 B2 | 8/2011 | Vecchio et al. |
| 8,020,619 B1 | 9/2011 | Robertson et al. |
| 8,020,620 B2 | 9/2011 | Daniels et al. |
| 8,025,104 B2 | 9/2011 | Cooke, Jr. |
| 8,028,767 B2 | 10/2011 | Radford et al. |
| 8,033,331 B2 | 10/2011 | Themig |
| 8,039,422 B1 | 10/2011 | Al-Zahrani |
| 8,056,628 B2 | 11/2011 | Whitsitt et al. |
| 8,056,638 B2 | 11/2011 | Clayton et al. |
| 8,109,340 B2 | 2/2012 | Doane et al. |
| 8,127,856 B1 | 3/2012 | Nish et al. |
| 8,153,052 B2 | 4/2012 | Jackson et al. |
| 8,163,060 B2 | 4/2012 | Imanishi et al. |
| 8,211,247 B2 | 7/2012 | Marya et al. |
| 8,211,248 B2 | 7/2012 | Marya |
| 8,226,740 B2 | 7/2012 | Chaumonnot et al. |
| 8,230,731 B2 | 7/2012 | Dyer et al. |
| 8,231,947 B2 | 7/2012 | Vaidya et al. |
| 8,263,178 B2 * | 9/2012 | Boulos et al. ............... 427/212 |
| 8,276,670 B2 | 10/2012 | Patel |
| 8,277,974 B2 | 10/2012 | Kumar et al. |
| 8,297,364 B2 | 10/2012 | Agrawal et al. |
| 8,327,931 B2 | 12/2012 | Agrawal et al. |
| 8,403,037 B2 | 3/2013 | Agrawal et al. |
| 8,425,651 B2 | 4/2013 | Xu et al. |
| 8,459,347 B2 | 6/2013 | Stout |
| 8,490,689 B1 | 7/2013 | McClinton et al. |
| 8,535,604 B1 | 9/2013 | Baker et al. |
| 8,573,295 B2 | 11/2013 | Johnson |
| 8,631,876 B2 | 1/2014 | Xu et al. |
| 8,956,660 B2 | 2/2015 | Launag et al. |
| 9,079,246 B2 * | 7/2015 | Xu et al. |
| 9,080,098 B2 | 7/2015 | Xu et al. |
| 9,260,935 B2 | 2/2016 | Murphree et al. |
| 2001/0040180 A1 | 11/2001 | Wittebrood et al. |
| 2001/0045285 A1 | 11/2001 | Russell |
| 2001/0045288 A1 | 11/2001 | Allamon et al. |
| 2002/0000319 A1 | 1/2002 | Brunet |
| 2002/0007948 A1 | 1/2002 | Bayne et al. |
| 2002/0014268 A1 | 2/2002 | Vann |
| 2002/0020527 A1 | 2/2002 | Kilaas et al. |
| 2002/0066572 A1 | 6/2002 | Muth |
| 2002/0092654 A1 | 7/2002 | Coronado et al. |
| 2002/0096365 A1 | 7/2002 | Berscheidt et al. |
| 2002/0104616 A1 | 8/2002 | De et al. |
| 2002/0108756 A1 | 8/2002 | Harrall et al. |
| 2002/0136904 A1 | 9/2002 | Glass et al. |
| 2002/0139541 A1 | 10/2002 | Sheffield et al. |
| 2002/0162661 A1 | 11/2002 | Krauss et al. |
| 2003/0019639 A1 | 1/2003 | Mackay |
| 2003/0037925 A1 | 2/2003 | Walker et al. |
| 2003/0060374 A1 | 3/2003 | Cooke, Jr. |
| 2003/0075326 A1 | 4/2003 | Ebinger |
| 2003/0104147 A1 | 6/2003 | Bretschneider et al. |
| 2003/0111728 A1 | 6/2003 | Thai et al. |
| 2003/0127013 A1 | 7/2003 | Zavitsanos et al. |
| 2003/0141060 A1 | 7/2003 | Hailey et al. |
| 2003/0141061 A1 | 7/2003 | Hailey et al. |
| 2003/0141079 A1 | 7/2003 | Doane et al. |
| 2003/0150614 A1 | 8/2003 | Brown et al. |
| 2003/0155114 A1 | 8/2003 | Pedersen et al. |
| 2003/0155115 A1 | 8/2003 | Pedersen et al. |
| 2003/0159828 A1 | 8/2003 | Howard et al. |
| 2003/0164237 A1 | 9/2003 | Butterfield |
| 2003/0183391 A1 | 10/2003 | Hriscu et al. |
| 2003/0226668 A1 | 12/2003 | Zimmerman et al. |
| 2004/0005483 A1 | 1/2004 | Lin |
| 2004/0020832 A1 | 2/2004 | Richards et al. |
| 2004/0031605 A1 | 2/2004 | Mickey |
| 2004/0045723 A1 | 3/2004 | Slup et al. |
| 2004/0055758 A1 | 3/2004 | Brezinski et al. |
| 2004/0058167 A1 | 3/2004 | Arbab et al. |
| 2004/0069502 A1 | 4/2004 | Luke |
| 2004/0089449 A1 | 5/2004 | Walton et al. |
| 2004/0094297 A1 | 5/2004 | Malone et al. |
| 2004/0154806 A1 | 8/2004 | Bode et al. |
| 2004/0159428 A1 | 8/2004 | Hammond et al. |
| 2004/0159446 A1 | 8/2004 | Haugen et al. |
| 2004/0182583 A1 | 9/2004 | Doane et al. |
| 2004/0216868 A1 | 11/2004 | Owen, Sr. |
| 2004/0231845 A1 | 11/2004 | Cooke, Jr. |
| 2004/0251025 A1 | 12/2004 | Giroux et al. |
| 2004/0256109 A1 | 12/2004 | Johnson |
| 2004/0256157 A1 | 12/2004 | Tessari et al. |
| 2004/0261993 A1 | 12/2004 | Nguyen |
| 2004/0261994 A1 | 12/2004 | Nguyen et al. |
| 2005/0034876 A1 | 2/2005 | Doane et al. |
| 2005/0051329 A1 | 3/2005 | Blaisdell |
| 2005/0064247 A1 | 3/2005 | Sane |
| 2005/0069449 A1 | 3/2005 | Jackson et al. |
| 2005/0074612 A1 | 4/2005 | Eklund et al. |
| 2005/0098313 A1 | 5/2005 | Atkins et al. |
| 2005/0102255 A1 | 5/2005 | Bultman |
| 2005/0106316 A1 | 5/2005 | Rigney et al. |
| 2005/0126334 A1 | 6/2005 | Mirchandani |
| 2005/0161212 A1 | 7/2005 | Leismer et al. |
| 2005/0161224 A1 | 7/2005 | Starr et al. |
| 2005/0165149 A1 | 7/2005 | Chanak et al. |
| 2005/0194143 A1 | 9/2005 | Xu et al. |
| 2005/0199401 A1 | 9/2005 | Patel et al. |
| 2005/0205264 A1 | 9/2005 | Starr et al. |
| 2005/0205265 A1 | 9/2005 | Todd et al. |
| 2005/0205266 A1 | 9/2005 | Todd et al. |
| 2005/0235757 A1 | 10/2005 | De Jonge et al. |
| 2005/0241824 A1 | 11/2005 | Burris, II et al. |
| 2005/0241825 A1 | 11/2005 | Burris, II et al. |
| 2005/0257936 A1 | 11/2005 | Lehr |
| 2005/0268746 A1 | 12/2005 | Abkowitz et al. |
| 2005/0269097 A1 | 12/2005 | Towler |
| 2005/0275143 A1 | 12/2005 | Toth |
| 2005/0279501 A1 | 12/2005 | Surjaatmadja et al. |
| 2006/0012087 A1 | 1/2006 | Matsuda et al. |
| 2006/0013350 A1 | 1/2006 | Akers |
| 2006/0045787 A1 | 3/2006 | Jandeska et al. |
| 2006/0057479 A1 | 3/2006 | Niimi et al. |
| 2006/0081378 A1 | 4/2006 | Howard et al. |
| 2006/0102871 A1 | 5/2006 | Wang |
| 2006/0108114 A1 | 5/2006 | Johnson et al. |
| 2006/0108126 A1 | 5/2006 | Horn et al. |
| 2006/0110615 A1 | 5/2006 | Karim et al. |

(56) References Cited

U.S. PATENT DOCUMENTS

| | | |
|---|---|---|
| 2006/0116696 A1 | 6/2006 | Odermatt et al. |
| 2006/0124310 A1 | 6/2006 | Lopez De Cardenas et al. |
| 2006/0124312 A1 | 6/2006 | Rytlewski et al. |
| 2006/0131011 A1 | 6/2006 | Lynde et al. |
| 2006/0131031 A1 | 6/2006 | McKeachnie et al. |
| 2006/0131081 A1 | 6/2006 | Mirchandani et al. |
| 2006/0144515 A1 | 7/2006 | Tada et al. |
| 2006/0150770 A1 | 7/2006 | Freim |
| 2006/0151178 A1 | 7/2006 | Howard et al. |
| 2006/0153728 A1 | 7/2006 | Schoenung et al. |
| 2006/0162927 A1 | 7/2006 | Walker et al. |
| 2006/0169453 A1 | 8/2006 | Savery et al. |
| 2006/0186602 A1 | 8/2006 | Martin et al. |
| 2006/0207763 A1 | 9/2006 | Hofman et al. |
| 2006/0213670 A1 | 9/2006 | Bishop et al. |
| 2006/0231253 A1 | 10/2006 | Vilela et al. |
| 2006/0283592 A1 | 12/2006 | Sierra et al. |
| 2007/0017674 A1 | 1/2007 | Blaisdell |
| 2007/0017675 A1 | 1/2007 | Hammami |
| 2007/0029082 A1 | 2/2007 | Giroux et al. |
| 2007/0039161 A1 | 2/2007 | Garcia |
| 2007/0039741 A1 | 2/2007 | Hailey |
| 2007/0044958 A1 | 3/2007 | Rytlewski et al. |
| 2007/0044966 A1 | 3/2007 | Davies et al. |
| 2007/0051521 A1 | 3/2007 | Fike et al. |
| 2007/0053785 A1 | 3/2007 | Hetz et al. |
| 2007/0054101 A1 | 3/2007 | Sigalas et al. |
| 2007/0057415 A1 | 3/2007 | Katagiri et al. |
| 2007/0062644 A1 | 3/2007 | Nakamura et al. |
| 2007/0074601 A1 | 4/2007 | Hong et al. |
| 2007/0074873 A1 | 4/2007 | McKeachnie et al. |
| 2007/0102199 A1 | 5/2007 | Smith et al. |
| 2007/0107899 A1 | 5/2007 | Werner et al. |
| 2007/0107908 A1 | 5/2007 | Vaidya et al. |
| 2007/0108060 A1 | 5/2007 | Park |
| 2007/0119600 A1 | 5/2007 | Slup et al. |
| 2007/0131912 A1 | 6/2007 | Simone et al. |
| 2007/0151009 A1 | 7/2007 | Conrad, III et al. |
| 2007/0151769 A1 | 7/2007 | Slutz et al. |
| 2007/0169935 A1 | 7/2007 | Akbar et al. |
| 2007/0181224 A1 | 8/2007 | Marya et al. |
| 2007/0185655 A1 | 8/2007 | Le Bemadjiel |
| 2007/0187095 A1 | 8/2007 | Walker et al. |
| 2007/0207182 A1 | 9/2007 | Weber et al. |
| 2007/0221373 A1 | 9/2007 | Murray |
| 2007/0221384 A1 | 9/2007 | Murray |
| 2007/0227745 A1 | 10/2007 | Roberts et al. |
| 2007/0259994 A1 | 11/2007 | Tour et al. |
| 2007/0261862 A1 | 11/2007 | Murray |
| 2007/0272411 A1 | 11/2007 | Lopez De Cardenas et al. |
| 2007/0272413 A1 | 11/2007 | Rytlewski et al. |
| 2007/0277979 A1 | 12/2007 | Todd et al. |
| 2007/0284109 A1 | 12/2007 | East et al. |
| 2007/0284112 A1 | 12/2007 | Magne et al. |
| 2007/0299510 A1 | 12/2007 | Venkatraman et al. |
| 2008/0011473 A1 | 1/2008 | Wood et al. |
| 2008/0020923 A1 | 1/2008 | Debe et al. |
| 2008/0047707 A1 | 2/2008 | Boney et al. |
| 2008/0060810 A9 | 3/2008 | Nguyen et al. |
| 2008/0066923 A1 | 3/2008 | Xu |
| 2008/0066924 A1 | 3/2008 | Xu |
| 2008/0072705 A1 | 3/2008 | Chaumonnot et al. |
| 2008/0078553 A1 | 4/2008 | George |
| 2008/0081866 A1 | 4/2008 | Gong et al. |
| 2008/0093073 A1 | 4/2008 | Bustos et al. |
| 2008/0099209 A1 | 5/2008 | Loretz et al. |
| 2008/0105438 A1 | 5/2008 | Jordan et al. |
| 2008/0115932 A1 | 5/2008 | Cooke |
| 2008/0121390 A1 | 5/2008 | O'Malley et al. |
| 2008/0121436 A1 | 5/2008 | Slay et al. |
| 2008/0127475 A1 | 6/2008 | Griffo |
| 2008/0135249 A1 | 6/2008 | Fripp et al. |
| 2008/0149325 A1 | 6/2008 | Crawford |
| 2008/0149345 A1 | 6/2008 | Marya et al. |
| 2008/0149351 A1 | 6/2008 | Marya et al. |
| 2008/0169105 A1 | 7/2008 | Williamson et al. |
| 2008/0169130 A1 | 7/2008 | Norman et al. |
| 2008/0179060 A1 | 7/2008 | Surjaatmadja et al. |
| 2008/0179104 A1 | 7/2008 | Zhang et al. |
| 2008/0196801 A1 | 8/2008 | Zhao et al. |
| 2008/0202764 A1 | 8/2008 | Clayton et al. |
| 2008/0202814 A1 | 8/2008 | Lyons et al. |
| 2008/0210473 A1 | 9/2008 | Zhang et al. |
| 2008/0216383 A1 | 9/2008 | Pierick et al. |
| 2008/0223586 A1 | 9/2008 | Barnett |
| 2008/0223587 A1 | 9/2008 | Cherewyk |
| 2008/0236829 A1 | 10/2008 | Lynde |
| 2008/0236842 A1 | 10/2008 | Bhavsar et al. |
| 2008/0248205 A1 | 10/2008 | Blanchet et al. |
| 2008/0248413 A1 | 10/2008 | Ishii et al. |
| 2008/0264594 A1 | 10/2008 | Lohmueller et al. |
| 2008/0277109 A1 | 11/2008 | Vaidya |
| 2008/0277980 A1 | 11/2008 | Koda et al. |
| 2008/0282924 A1 | 11/2008 | Saenger et al. |
| 2008/0296024 A1 | 12/2008 | Huang et al. |
| 2008/0302538 A1 | 12/2008 | Hofman |
| 2008/0314581 A1 | 12/2008 | Brown |
| 2008/0314588 A1 | 12/2008 | Langlais et al. |
| 2009/0038858 A1 | 2/2009 | Griffo et al. |
| 2009/0044946 A1 | 2/2009 | Schasteen et al. |
| 2009/0044949 A1 | 2/2009 | King et al. |
| 2009/0044955 A1 | 2/2009 | King et al. |
| 2009/0050334 A1 | 2/2009 | Marya et al. |
| 2009/0056934 A1 | 3/2009 | Xu |
| 2009/0065216 A1 | 3/2009 | Frazier |
| 2009/0074603 A1 | 3/2009 | Chan et al. |
| 2009/0084553 A1 | 4/2009 | Rytlewski et al. |
| 2009/0084556 A1 | 4/2009 | Richards et al. |
| 2009/0084600 A1 | 4/2009 | Severance |
| 2009/0090440 A1 | 4/2009 | Kellett et al. |
| 2009/0107684 A1 | 4/2009 | Cooke, Jr. |
| 2009/0114381 A1 | 5/2009 | Stroobants |
| 2009/0114382 A1 | 5/2009 | Grove et al. |
| 2009/0126436 A1 | 5/2009 | Fly et al. |
| 2009/0139720 A1 | 6/2009 | Frazier |
| 2009/0145666 A1 | 6/2009 | Radford et al. |
| 2009/0151949 A1 | 6/2009 | Marya et al. |
| 2009/0152009 A1 | 6/2009 | Slay et al. |
| 2009/0155616 A1 | 6/2009 | Thamida et al. |
| 2009/0159289 A1 | 6/2009 | Avant et al. |
| 2009/0178808 A1 | 7/2009 | Williamson et al. |
| 2009/0194273 A1 | 8/2009 | Surjaatmadja et al. |
| 2009/0205841 A1 | 8/2009 | Kluge et al. |
| 2009/0211770 A1 | 8/2009 | Nutley et al. |
| 2009/0226340 A1 | 9/2009 | Marya |
| 2009/0226704 A1 | 9/2009 | Kauppinen et al. |
| 2009/0242202 A1 | 10/2009 | Rispler et al. |
| 2009/0242208 A1 | 10/2009 | Bolding |
| 2009/0242214 A1 | 10/2009 | Foster et al. |
| 2009/0255667 A1 | 10/2009 | Clem et al. |
| 2009/0255684 A1 | 10/2009 | Bolding |
| 2009/0255686 A1 | 10/2009 | Richard |
| 2009/0260817 A1 | 10/2009 | Gambier et al. |
| 2009/0266548 A1 | 10/2009 | Olsen et al. |
| 2009/0272544 A1 | 11/2009 | Giroux et al. |
| 2009/0283270 A1 | 11/2009 | Langeslag |
| 2009/0293672 A1 | 12/2009 | Mirchandani et al. |
| 2009/0301730 A1 | 12/2009 | Gweily |
| 2009/0305131 A1 | 12/2009 | Kumar et al. |
| 2009/0308588 A1 | 12/2009 | Howell et al. |
| 2009/0317556 A1 | 12/2009 | Macary |
| 2009/0317622 A1 | 12/2009 | Huang et al. |
| 2010/0003536 A1 | 1/2010 | Smith et al. |
| 2010/0012385 A1 | 1/2010 | Drivdahl et al. |
| 2010/0015002 A1 | 1/2010 | Barrera et al. |
| 2010/0015469 A1 | 1/2010 | Romanowski et al. |
| 2010/0025255 A1 | 2/2010 | Su et al. |
| 2010/0032151 A1 | 2/2010 | Duphorne et al. |
| 2010/0034857 A1 | 2/2010 | Launag et al. |
| 2010/0038076 A1 | 2/2010 | Spray et al. |
| 2010/0038595 A1 | 2/2010 | Imholt et al. |
| 2010/0040180 A1 | 2/2010 | Kim et al. |
| 2010/0044041 A1 | 2/2010 | Smith et al. |
| 2010/0051278 A1 | 3/2010 | Mytopher et al. |

(56) References Cited

U.S. PATENT DOCUMENTS

| | | |
|---|---|---|
| 2010/0055491 A1 | 3/2010 | Vecchio et al. |
| 2010/0055492 A1 | 3/2010 | Barsoum et al. |
| 2010/0089583 A1 | 4/2010 | Xu et al. |
| 2010/0089587 A1 | 4/2010 | Stout |
| 2010/0101803 A1 | 4/2010 | Clayton et al. |
| 2010/0116495 A1 | 5/2010 | Spray |
| 2010/0122817 A1 | 5/2010 | Surjaatmadja et al. |
| 2010/0139930 A1 | 6/2010 | Patel et al. |
| 2010/0200230 A1 | 8/2010 | East, Jr. et al. |
| 2010/0236793 A1 | 9/2010 | Bjorgum |
| 2010/0236794 A1 | 9/2010 | Duan et al. |
| 2010/0243254 A1 | 9/2010 | Murphy et al. |
| 2010/0252273 A1 | 10/2010 | Duphorne |
| 2010/0252280 A1 | 10/2010 | Swor et al. |
| 2010/0270031 A1 | 10/2010 | Patel |
| 2010/0276136 A1 | 11/2010 | Evans et al. |
| 2010/0276159 A1 | 11/2010 | Mailand et al. |
| 2010/0282338 A1 | 11/2010 | Gerrard et al. |
| 2010/0282469 A1 | 11/2010 | Richard et al. |
| 2010/0294510 A1 | 11/2010 | Holmes |
| 2010/0297432 A1 | 11/2010 | Sherman et al. |
| 2010/0304182 A1 | 12/2010 | Facchini et al. |
| 2010/0314105 A1 | 12/2010 | Rose |
| 2010/0314126 A1 | 12/2010 | Kellner |
| 2010/0319870 A1 | 12/2010 | Bewlay et al. |
| 2010/0326650 A1 | 12/2010 | Tran et al. |
| 2011/0005773 A1 | 1/2011 | Dusterhoft et al. |
| 2011/0036592 A1 | 2/2011 | Fay |
| 2011/0048743 A1 | 3/2011 | Stafford et al. |
| 2011/0052805 A1 | 3/2011 | Bordere et al. |
| 2011/0056692 A1 | 3/2011 | Lopez De Cardenas et al. |
| 2011/0056702 A1 | 3/2011 | Sharma et al. |
| 2011/0067872 A1 | 3/2011 | Agrawal |
| 2011/0067889 A1 | 3/2011 | Marya et al. |
| 2011/0067890 A1 | 3/2011 | Themig |
| 2011/0094406 A1 | 4/2011 | Marya et al. |
| 2011/0100643 A1 | 5/2011 | Themig et al. |
| 2011/0127044 A1 | 6/2011 | Radford et al. |
| 2011/0132143 A1 | 6/2011 | Xu et al. |
| 2011/0132612 A1 | 6/2011 | Agrawal et al. |
| 2011/0132619 A1 | 6/2011 | Agrawal et al. |
| 2011/0132620 A1 | 6/2011 | Agrawal et al. |
| 2011/0132621 A1 | 6/2011 | Agrawal et al. |
| 2011/0135530 A1 | 6/2011 | Xu et al. |
| 2011/0135805 A1 | 6/2011 | Doucet et al. |
| 2011/0135953 A1 * | 6/2011 | Xu et al. ............... 428/548 |
| 2011/0136707 A1 | 6/2011 | Xu et al. |
| 2011/0139465 A1 | 6/2011 | Tibbles et al. |
| 2011/0147014 A1 | 6/2011 | Chen et al. |
| 2011/0186306 A1 | 8/2011 | Marya et al. |
| 2011/0214881 A1 | 9/2011 | Newton |
| 2011/0247833 A1 | 10/2011 | Todd et al. |
| 2011/0253387 A1 | 10/2011 | Ervin |
| 2011/0256356 A1 | 10/2011 | Tomantschger et al. |
| 2011/0259610 A1 | 10/2011 | Shkurti et al. |
| 2011/0277987 A1 | 11/2011 | Frazier |
| 2011/0277989 A1 | 11/2011 | Frazier |
| 2011/0284232 A1 | 11/2011 | Huang |
| 2011/0284240 A1 | 11/2011 | Chen et al. |
| 2011/0284243 A1 | 11/2011 | Frazier |
| 2011/0300403 A1 | 12/2011 | Vecchio et al. |
| 2011/0314881 A1 | 12/2011 | Hatcher et al. |
| 2012/0024109 A1 | 2/2012 | Xu et al. |
| 2012/0067426 A1 | 3/2012 | Soni et al. |
| 2012/0090839 A1 | 4/2012 | Rudic |
| 2012/0103135 A1 | 5/2012 | Xu et al. |
| 2012/0107590 A1 | 5/2012 | Xu et al. |
| 2012/0118583 A1 | 5/2012 | Johnson et al. |
| 2012/0130470 A1 | 5/2012 | Agnew |
| 2012/0145378 A1 | 6/2012 | Frazier et al. |
| 2012/0145389 A1 | 6/2012 | Fitzpatrick, Jr. |
| 2012/0168152 A1 | 7/2012 | Casciaro et al. |
| 2012/0177905 A1 | 7/2012 | Seals et al. |
| 2012/0205120 A1 | 8/2012 | Howell |
| 2012/0205872 A1 | 8/2012 | Reinhardt et al. |
| 2012/0211239 A1 | 8/2012 | Kritzler et al. |
| 2012/0234546 A1 | 9/2012 | Xu et al. |
| 2012/0234547 A1 | 9/2012 | O'Malley et al. |
| 2012/0267101 A1 | 10/2012 | Cooke |
| 2012/0292053 A1 | 11/2012 | Xu et al. |
| 2012/0318513 A1 | 12/2012 | Mazyar et al. |
| 2013/0004847 A1 | 1/2013 | Kumar et al. |
| 2013/0008671 A1 | 1/2013 | Booth et al. |
| 2013/0025409 A1 | 1/2013 | Xu |
| 2013/0029886 A1 | 1/2013 | Mazyar et al. |
| 2013/0032357 A1 | 2/2013 | Mazyar et al. |
| 2013/0048304 A1 | 2/2013 | Agrawal et al. |
| 2013/0048305 A1 | 2/2013 | Xu et al. |
| 2013/0052472 A1 | 2/2013 | Xu |
| 2013/0081814 A1 | 4/2013 | Gaudette et al. |
| 2013/0084643 A1 | 4/2013 | Commarieu et al. |
| 2013/0105159 A1 | 5/2013 | Alvarez |
| 2013/0126190 A1 | 5/2013 | Mazyar et al. |
| 2013/0133897 A1 | 5/2013 | Baihly et al. |
| 2013/0146144 A1 | 6/2013 | Joseph et al. |
| 2013/0146302 A1 | 6/2013 | Gaudette et al. |
| 2013/0168257 A1 | 7/2013 | Mazyar et al. |
| 2013/0186626 A1 | 7/2013 | Aitken et al. |
| 2013/0240200 A1 | 9/2013 | Frazier |
| 2013/0240203 A1 | 9/2013 | Frazier |
| 2013/0299185 A1 | 11/2013 | Xu et al. |
| 2013/0299192 A1 | 11/2013 | Xu et al. |
| 2013/0300066 A1 | 11/2013 | Xu et al. |
| 2013/0319668 A1 | 12/2013 | Tschetter et al. |
| 2013/0327540 A1 | 12/2013 | Hamid et al. |
| 2014/0014339 A1 | 1/2014 | O'Malley et al. |
| 2014/0027128 A1 | 1/2014 | Johnson |
| 2014/0060834 A1 | 3/2014 | Quintero et al. |
| 2014/0116711 A1 | 5/2014 | Tang et al. |
| 2014/0262327 A1 | 9/2014 | Xu et al. |
| 2014/0360728 A1 | 12/2014 | Tashiro et al. |
| 2015/0060085 A1 | 3/2015 | Xu |
| 2016/0209391 A1 | 7/2016 | Zhang et al. |
| 2016/0258242 A1 | 9/2016 | Hayter et al. |

FOREIGN PATENT DOCUMENTS

| | | |
|---|---|---|
| CN | 1076968 A | 10/1993 |
| CN | 1079234 A | 12/1993 |
| CN | 1255879 A | 6/2000 |
| CN | 1668545 A | 9/2005 |
| CN | 1882759 A1 | 12/2006 |
| CN | 101050417 A | 10/2007 |
| CN | 101351523 A | 1/2009 |
| CN | 101454074 A | 6/2009 |
| CN | 101457321 A | 6/2009 |
| EP | 0033625 A1 | 8/1981 |
| EP | 1174385 A2 | 1/2002 |
| EP | 1412175 A1 | 4/2004 |
| EP | 1798301 A1 | 8/2006 |
| EP | 1857570 A2 | 11/2007 |
| FR | 2782096 A1 | 2/2000 |
| GB | 912956 | 12/1962 |
| GB | 1046330 A | 10/1966 |
| GB | 1280833 A | 7/1972 |
| GB | 1357065 A | 6/1974 |
| JP | 61067770 | 4/1986 |
| JP | 754008 A | 2/1995 |
| JP | 8232029 A | 9/1996 |
| JP | 2000185725 A1 | 7/2000 |
| JP | 2002053902 A | 2/2002 |
| JP | 2004225084 A | 8/2004 |
| JP | 2004225765 A | 8/2004 |
| JP | 2005076052 A | 3/2005 |
| JP | 2010502840 A | 1/2010 |
| KR | 950014350 B1 | 11/1995 |
| WO | 9909227 A1 | 2/1999 |
| WO | 9947726 | 9/1999 |
| WO | 03008186 A1 | 1/2003 |
| WO | 2004001087 A1 | 12/2003 |
| WO | 2004073889 A1 | 9/2004 |
| WO | 2005040068 A | 5/2005 |
| WO | 2007044635 A | 4/2007 |
| WO | 2007095376 A2 | 8/2007 |

(56) References Cited

FOREIGN PATENT DOCUMENTS

| | | | |
|---|---|---|---|
| WO | 2008034042 | A3 | 3/2008 |
| WO | 2008057045 | A1 | 5/2008 |
| WO | 2008079485 | A2 | 7/2008 |
| WO | 2008079777 | A3 | 7/2008 |
| WO | 2009079745 | A1 | 7/2009 |
| WO | 2010012184 | A1 | 2/2010 |
| WO | 2011071902 | A2 | 6/2011 |
| WO | 2011071910 | A2 | 6/2011 |
| WO | 2011071910 | A3 | 6/2011 |
| WO | 2011130063 | A3 | 2/2012 |
| WO | 2012015567 | A2 | 2/2012 |
| WO | 2012149007 | A2 | 11/2012 |
| WO | 2012174101 | A2 | 12/2012 |
| WO | 2013053057 | A1 | 4/2013 |
| WO | 2013078031 | A1 | 5/2013 |
| WO | 2014121384 | A1 | 8/2014 |

OTHER PUBLICATIONS

S.R. Bakshi et al., "Carbon nanotube reinforced metal matrix composites—a review," International Materials Reviews; 2010, pp. 41-64, vol. 55, No. 1.

Bin et al., "Advances in Fluidization CVD Technology", East China University of Chemical Technology, China Academic Journal Electronic Publishing House, vol. 13, No. 4, Nov. 1992, pp. 360-365, English Abstract on p. 366.

Chinese Office Action; Chinese Application No. 201280041839.9; Date of Mailing: Feb. 10, 2015; pp. 1-20.

International Search Report and Written Opinion; International Application No. PCT/US2012/052836; International Filing Date: Aug. 29, 2012; Date of Mailing Feb. 1, 2013; 9 pages.

Lin et al., "Processing and Microstructure of Nano-Mo/Al2O3 Composites from MOCVD and Fluidized Bed", Nanostructured Materials, Nov. 1999, vol. 11, No. 8, pp. 1361-1377.

Spencer et al., "Fluidized Bed Polymer Particle ALD Process for Producing HDPE/Alumina Nanocomposites".

Australian Examination Report for Australian patent application No. 2012302067 dated Sep. 22, 2015.

Canadian Office Action for Canadian Application No. 2,841,068, dated Nov. 9, 2015, pp. 1-4.

Chinese Office Action for Chinese Patent Application No. 201280041531.4 dated Aug. 31, 2015.

European Search Report for EP Application No. 10836533.9 dated Jul. 27, 2015.

European Search Report for EP Application No. 10836538.8 dated Jul. 27, 2015.

European Search Report for EP Application No. 10836539.6 dated Jul. 27, 2015.

European Search Report for EP Application No. 10836540.4 dated Aug. 20, 2015.

Tsipas et al. "Effect of High Energy Ball Milling on Titanium-Hydroxyapatite Powders" Powder Metallurgy, Maney Publishing, London, GB, vol. 46, No. 1, Mar. 2003, pp. 73-77.

Extended European Search Report; EP Application No. 12822169.4-1605/2739812; Mailing Date: Nov. 17, 2015; 9 pages.

M.S. Senthil Saravanan et al, "Mechanically Alloyed Carbon Nanotubes (CNT) Reinforced Nanocrystalline AA 4032: Synthesis and Characterization", Journal of Minerals and Materials Characterization and Engineering, vol. 9, No. 11 pp. 1027-1035 2010.

European Search Report for EP Application No. 12827733.2 dated Jan. 21, 2015.

European Search Report for EP Application No. 12827915.5 dated Dec. 23, 2015.

European Search Report for EP Application No. 12828903.0 dated Jan. 11, 2016.

Extended European Search Report for EP Application No. 12828379.3-1373, dated May 20, 2016, 8 pages.

International Search Report and Written Opinion; International Application No. PCT/US2015/066353; International Filing Date: Dec. 17, 2015; Date of Mailing: Apr. 1, 2016; 14 pages.

"Baker Hughes Refines Expandable Tubular Technology with Abaqus and Isight", Simulia Realistic Simulation News, Jan./Feb. 2011, pp. 12-13.

Birbilis, et al., "Exploring Corrosion Protection of Mg Via Ionic Liquid Pretreatment", Surface & Coatings Technology; 201, pp. 4496-4504, (2007).

Bououdina, et al., "Comparative Study of Mechanical Alloying of (Mg+Al) and (Mg+Al+Ni) Mixtures for Hydrogen Storage", J. Alloys, Compds, 2002, 336, 222-231.

Coronado, "Development of an Internal Coiled Tubing Connector Utilizing Permanent Packer Technology"; Society of Petroleum Engineers, SPE Paper No. 46036; Apr. 15, 1998; 10 pages.

Feng, et al., "Electroless Plating of Carbon Nanotubes with Silver" Journal of Materials Science, 39, (2004) pp. 3241-3243.

Hsiao, et al., "Characterization of Anodic Films Formed on AZ91D Magnesium Alloy"; Surface & Coatings Technology; 190; pp. 299-308; (2005).

International Search Report and Written Opinion; International Application No. PCT/US2010/059259; International Filing Date: Dec. 7, 2010; Date of Mailing: Jun. 13, 2011; 8 pages.

International Search Report and Written Opinion; International Application No. PCT/US2010/059265; International Filing Date: Dec. 7, 2010; Date of Mailing: Jun. 16, 2011; 8 pages.

International Search Report and Written Opinion; International Application No. PCT/US2012/034973; International Filing Date: Apr. 25, 2012; Date of Mailing: Nov. 29, 2012; 8 pages.

International Search Report and Written Opinion; International Application No. PCT/US2012/038622; International Filing Date: May 18, 2012; Date of Mailing: Dec. 6, 2012; 12 pages.

International Search Report and Written Opinion; International Application No. PCT/US2012/044866; International Filing Date: Jun. 29, 2012; Date of Mailing: Jan. 2, 2013; 9 pages.

International Search Report and Written Opinion; International Application No. PCT/US2012/049434; International Filing Date: Aug. 3, 2012; Date of Mailing: Feb. 1, 2013; 7 pages.

International Search Report and Written Opinion; International Application No. PCT/US2012/053342; International Filing Date: Aug. 31, 2012; Date of Mailing: Feb. 19, 2013; 9 pages.

International Search Report and Written Opinion; International Application No. PCT/US2012/053350; International Filing Date: Aug. 31, 2012; Date of Mailing: Feb. 25, 2013; 10 pages.

International Search Report and Written Opinion; International Application No. PCT/US2014/010862; International Filing Date: Jan. 9, 2014; Date of Mailing: Apr. 21, 2014; 9 pages.

International Search Report; International Application No. PCT/US2012/044229, International Filing Date: Jun. 26, 2012; Date of Mailing; Jan. 30, 2013; 3 pages.

Kuzumaki, et al.; "Mechanical Characteristics and Preparation of Carbon Nanotube Fiber-Reinforced Ti Composite", Advanced Engineering Materials, 2000, 2, No. 7.

Li, et al., "Investigation of aluminium-based nancompsoites with ultra-high strength", Materials Science and Engineering A, 527, pp. 305-316, (2009).

Liu, et al., "Calculated Phase Diagrams and the Corrosion of Die-Cast Mg—Al Alloys", Corrosion Science, 2009, 51, 606-619.

Liu, et al.; "Electroless Nickel Plating on AZ91 Mg Alloy Substrate"; Surface & Coatings Technology; 200; pp. 5087-5093; (2006).

Majumdar, et al., "Laser Surface Engineering of a Magnesium Alloy with Al+Al2O3", Surface and Coatings Technology 179 (2004) pp. 297-305.

Mathis, "Sand Management: A Review of Approaches and Concerns", Society of Petroleum Engineers, SPE Paper No. 82240, SPE European Formation Damage Conference, The Hague, The Netherlands, May 13-14, 2003.

Pardo, et al.; "Corrosion Behaviour of Magnesium/Aluminium Alloys in 3.5 wt% NaCl"; Corrosion Science; 50; pp. 823-834; (2008).

Quik Drill Composite Frac Plug; Baker Hughes, Baker Oil Tools; Copyright 2002; 3 pages.

Shaw, "Benefits and Application of a Surface-Controlled Sliding Sleeve for Fracturing Operations"; Society of Petroleum Engineers, SPE Paper No. 147546; Oct. 30, 2011; 8 pages.

(56) References Cited

OTHER PUBLICATIONS

Shi, et al.; "Influence of the Beta Phase on the Corrosion Performance of Anodised Coatings on Magnesium-Aluminium Alloys"; Corrosion Science; 47; pp. 2760-2777; (2005).
Shimizu, et al., "Multi-walled carbon nanotube-reinforced magnesium alloy composites", Scripta Materialia, vol. 58, Issue 4, Feb. 2008, pp. 267-270.
Shumbera, et al. "Improved Water Injector Performance in a Gulf of Mexico Deepwater Development Using an Openhole Frac Pack Completion and Downhole Filter System: Case History." SPE Annual Technical Conference and Exhibition, Oct. 5-8, 2003.
Song, "Recent Progress in Corrosion and Protection of Magnesium Alloys"; Advanced Engineering Materials; 7(7); pp. 563-586; (2005).
Song, et al.; "A Possible Biodegradable Magnesium Implant Material," Advanced Engineering Materials, vol. 9, Issue 4, Apr. 2007, pp. 298-302.
Song, et al.; "Corrosion Behaviour of AZ21, AZ501 and AZ91 in Sodium Chloride"; Corrosion Science; 40(10); pp. 1769-1791; (1998).
Song, et al.; "Corrosion Mechanisms of Magnesium Alloys"; Advanced Engineering Materials; 1(1); pp. 11-33; (1999).
Song, et al.; "Influence of Microstructure on the Corrosion of Diecast AZ91D"; Corrosion Science; 41; pp. 249-273; (1999).
Song, et al.; "Understanding Magnesium Corrosion"; Advanced Engineering Materials; 5; No. 12; pp. 837-858; (2003).
Sun, et al.; "Colloidal Processing of Carbon Nanotube/Alumina Composites" Chem. Mater. 2002, 14, pp. 5169-5172.
Triolo et al., "Resolving the Completion Engineer's Dilemma: Permanent or Retrievable Packer?"; Society of Petroleum Engineers, SPE Paper No. 76711; May 20, 2002; 16 pages.
Vernon Constien et al., "Development of Reactive Coatings to Protect Sand-Control Screens", SPE 112494, Copyright 2008, Society of Petroleum Engineers, Presented at the 2008 SPE International Symposium and Exhibition on Formation Damage Control.
Vickery, et al.; "New One-Trip Multi-Zone Frac Pack System with Positive Positioning." European Petroleum Conference, Oct. 29-31, 2002, Aberdeen, UK. [Abstract Only].
Walters, et al.; "A Study of Jets from Unsintered-Powder Metal Lined Nonprecision Small-Caliber Shaped Charges", Army Research Laboratory, Aberdeen Proving Ground, MD 21005-5066; Feb. 2001.
Wang, et al., "Contact-Damage-Resistant Ceramic/Single-Wall Carbon Nanotubes and Ceramic/Graphite Composites" Nature Materials, vol. 3, Aug. 2004, pp. 539-544.
Watanabe, et al., "Superplastic Deformation Mechanism in Powder Metallurgy Magnesium Alloys and Composites", Acta mater. 49 (2001) pp. 2027-2037.
Watarai, Trend of research and development for magnesium alloys-reducing the weight of structural materials in motor vehicles, (2006) Science and technology trends, Quaterly review No. 18, 84-97.
Welch, et al., "Nonelastomeric Sliding Sleeve Maintains Long Term Integrity in HP/HT Application: Case Histories" [Abstract Only], SPE Eastern Regional Meeting, Oct. 23-25, 1996, Columbus. Ohio.
Xu, et al., "Nanostructured Material-Based Completion Tools Enhance Well Productivity"; International Petroleum Technology Conference; Conference Paper IPTC 16538; International Petroleum Technology Conference 2013; 4 pages.
Zeng, et al. "Progress and Challenge for Magnesium Alloys as Biomaterials," Advanced Engineering Materials, vol. 10, Issue 8, Aug. 2008, pp. B3-B14.
Zhang, et al.; "Formation of metal nanowires on suspended single-walled carbon nanotubes" Applied Physics Letter, vol. 77, No. 19 (2000), pp. 3015-3017.
Zhang, et al.; "Study on the Environmentally Friendly Anodizing of AZ91D Magnesium Alloy"; Surface and Coatings Technology: 161; pp. 36-43; (2002).
Zhu, et al., "The process of coating on ultrafine particles by surface hydrolysis reaction in a fluidized bed reactor", Surface and Coatings Technology 135 (2000) 14-17.

"Reactivity series", Wikipedia, http://en.wikipedia.org/w/index.php?title=Reactivity_series&printable=yes downloaded on May 18, 2014. 8 pages.
Adams, et al.; "Thermal stabilities of aromatic acids as geothermal tracers", Geothermics, vol. 21, No. 3, 1992, pp. 323-339.
Aviles et al, "Degradable Alternative to Risky Mill-Out Operations in Plug and Perf"; SPE-173695-MS; Society of Petroleum Engineers; SPE/ICOTA Coiled Tubing & Well Intervention Conference & Exhibition; Mar. 24-25, 2015; 10 pages.
Ayman, et al.; "Effect of Consolidation and Extrusion Temperatures on Tensile Properties of Hot Extruded ZK61 Magnesium Alloy Gas Atomized Powders via Spark Plasma Sintering", Transactions of JWRI, vol. 38 (2009), No. 2, pp. 1-5.
Baker Hughes Incorporated. IN—Tallic Disintegrating Frac Balls. Houston: Baker Hughes Incorporated, 2011. Accessed Mar. 6, 2015.
Baker Hughes, "Multistage", Oct. 31, 2011, BakerHughes.com; accessed Mar. 6, 2015.
Chinese Office Action Issued Sep. 25, 2015 for Application No. 201280041839.9; 13 pages.
International Search Report and Written Opinion; International Application No. PCT/US2012/047163; International Filing Date: Jul. 18, 2012; Date of Mailing Feb. 26, 2013; 12 pages.
International Search Report and Written Opinion; International Application No. PCT/US2013/020046; International Filing Date: Jan. 3, 2013; Date of Mailing: Apr. 10, 2013; 7 pages.
International Search Report and Written Opinion; International Application No. PCT/US2013/050475; International Filing Date: Jul. 15, 2013; Date of Mailing: Oct. 10, 2013; 12 pages.
International Search Report and Written Opinion; International Application No. PCT/US2014/049347; International Filing Date: Aug. 1, 2014; Date of Mailing: Nov. 24, 2014; 11 pages.
International Search Report and Written Opinion; International Application No. PCT/US2014/054720; International Filing Date: Sep. 9, 2014; Date of Mailing: Dec. 17, 2014; 10 pages.
International Search Report and Written Opinion; International Application No. PCT/US2014/058997, International Filing Date: Oct. 3, 2014; Date of Mailing: Jan. 12, 2015; 12 pages.
International Search Report for related PCT Application No. PCT/US2013/035258, dated Jul. 4, 2013, pp. 1-4.
International Search Report for related PCT Application No. PCT/US2013/035261, dated Jul. 10, 2013, pp. 1-4.
International Search Report for related PCT Application No. PCT/US2013/035262, dated Jul. 1, 2013, pp. 1-4.
International Search Report for related PCT Application No. PCT/US2013/068062, dated Feb. 12, 2014, pp. 1-3.
Lee, et al., "Effects of Ni addition on hydrogen storage properties of Mg17Al12 alloy", Materials Chemistry and Physics, 2011, 126, pp. 319-324.
Australian Patent Examination Report issued Sep. 22, 2015 for Application No. 2012302067; 3 pages.
Rose, et al.; "The application of the polyaromatic sulfonates as tracers in geothermal reservoirs", Geothermics 30 (2001) pp. 617-640.
Shigematsu, et al.; "Surface Treatment of AZ91D Magnesium Alloy by Aluminum diffusion Coating", Journal of Materials Science Letters 19, 2000, pp. 473-475.
Singh, et al., "Extended Homogeneity Range of Intermetallic Phases in Mechanically Alloyed Mg—Al Alloys", Elsevier Sciences Ltd., Intemetallics 11, 2003, pp. 373-376.
Stanley, et al.; "An Introduction to Ground-Water Tracers", Department of Hydrology and Water Resources, University of Arizona, Mar. 1985, pp. 1-219.
Zemel, "Tracers in the Oil Field", University of Texas at Austin, Center for Petroleum and Geosystems, Jan. 1995, Chapters 1, 2, 3, 7.
Zhang, et al.; "High Strength Nanostructured Materials and Their Oil Field Applications"; Society of Petroleum Engineers; Conference Paper SPE 157092; SPE International Oilfield Nanotechnology Conference, 2012; 6 pages.
Zhang, et al.; "Metal Coating on Suspended Carbon Nanotubes and its Implication to Metal-Tube Interaction", Chemical Physics Letters 331 (2000) 35-41.

(56) References Cited

OTHER PUBLICATIONS

"Optisleeve Sliding Sleeve", [online]; [retrieved on Jun. 25, 2010]; retrieved from the Internet weatherford.com/weatherford/groups/.../weatherfordcorp/WFT033159.pdf.
"Sliding Sleeve", Omega Completion Technology Ltd, Sep. 29, 2009, retrieved on: www.omega-completion.com.
Ambat, et al., "Electroless Nickel-Plating on AZ91D Magnesium Alloy: Effect of Substrate Microstructure and Plating Parameters"; Surface and Coatings Technology; 179; pp. 124-134; (2004).
Baker Hughes, "Flow Control Systems," [online]; [retrieved on May 20, 2010]; retrieved from the Internet http://www.bakerhughes.com/products-and-services/completions-and-productions/well-completions/packers-and-flow-control/flow-control-systems.
Baker Oil Tools, "Baker Oil Tools Introduces Revolutionary Sand Control Completion Technology," May 2, 2005.
Baker Oil Tools, "Z-Seal Metal-to-Metal Expandable Sealing Device Uses Expanding Metal in Place of Elastomers," Nov. 6, 2006.
Bastow, et al., "Clustering and formation of nano-precipitates in dilute aluminum and magnesium alloys", Materials Science and Engineering, 2003, C23, 757-762.
Bercegeay, et al., "A One-Trip Gravel Packing System"; Society of Petroleum Engineers, Offshort Technology Conference, SPE Paper No. 4771; Feb. 7-8, 1974.
Bybee, "One-Trip Completion System Eliminates Perforations," Completions Today, Sep. 2007, pp. 52-53.
Carrejo, et al., "Improving Flow Assurance in Multi-Zone Fracturing Treatments in Hydrocarbon Reservoirs with High Strength Corrodible Tripping Balls"; Society of Petroleum Engineers; SPE Paper No. 151613; Apr. 16, 2012; 6 pages.
Chang, et al., "Electrodeposition of Aluminum on Magnesium Alloy in Aluminum Chloride (AlCl3)-1-ethyl-3-methylimidazolium chloride (EMIC) Ionic Liquid and Its Corrosion Behavior"; Electrochemistry Communications; 9; pp. 1602-1606; (2007).
Christoglou, et al., "Deposition of Aluminum on Magnesium by a CVD Process", Surface and Coatings Technology 184 (2004) 149-155.
Constantine, "Selective Production of Horizontal Openhole Completions Using ECP and Sliding Sleeve Technology." SPE Rocky Mountain Regional Meeting, May 15-18, 1999, Gillette, Wyoming. [Abstract Only].
Curtin, et al., "CNT-reinforced ceramics and metals," Materials Today, 2004, vol. 7, pp. 44-49.
Flahaut, et al., "Carbon Nanotube-Metal-Oxide Nanocomposites: Microstructure, Electrical Conductivity and Mechanical Properties" Acta amter. 48 (2000), pp. 3803-3812.
Forsyth, et al.; "An Ionic Liquid Surface Treatment for Corrosion Protection of Magnesium Alloy AZ31"; Electrochem. Solid-State Lett. 2006 vol. 9, Issue 11, B52-B55/ 9(11); Abstract only; 1 page.
Galanty, et al. "Consolidation of metal powders during the extrusion process," Journal of Materials Processing Technology (2002), pp. 491-496.
Garfield, "Formation Damage Control Utilizing Composite-Bridge-Plug Technology for Monobore, Multizone Stimulation Operations," SPE 70004, 2001, Society of Petroleum Engineers Inc., This paper was prepared for presentation at the SPE Per.
Garfield, New One-Trip Sand-Control Completion System that Eliminates Formation Damage Resulting From conventional Perforating and Gravel-Packing Operations:, SPE Annual Technical Conference and Exhibition, Oct. 9-12, 2005.
Garfield, et al., "Maximizing Inflow Performance in Soft Sand Completions Using New One-trip Sand Control Liner Completion Technology", SPE European Formation Damage Conference, May 25-27, 2005.
Goh, et al., "Development of novel carbon nanotube reinforced magnesium nanocomposites using the powder metallurgy technique", Nanottechnology 17 (2006) 7-12.
Gray, et al., "Protective Coatings on Magnesium and Its Alloys—a Critical Review", Journal of Alloys and Compounds 336 (2002), pp. 88-113.
Han, et al., "Mechanical Properties of Nanostructured Materials", Rev. Adv. Mater. Sci. 9(2005) 1-16.
Hermawan, et al., "Iron-manganese: new class of metallic degradable biomaterials prepared by powder metallurgy", Powder Metallurgy, vol. 51, No. 1, (2008), pp. 38-45.
Hjortstam, et al. "Can we achieve ultra-low resistivity in carbon nanotube-based metal composites," Applied Physics A (2004), vol. 78, Issue 8, pp. 1175-1179.
Hsiao, et al., "Anodization of AZ91D Magnesium Alloy in Silicate-Containing Electrolytes"; Surface & Coatings Technology; 199; pp. 127-134; (2005).
Hsiao, et al., "Baking Treatment Effect on Materials Characteristics and Electrochemical Behavior of anodic Film Formed on AZ91D Magnesium Alloy"; Corrosion Science; 49; pp. 781-793; (2007).
Hsiao, et al., "Effect of Heat Treatment on Anodization and Electrochemical Behavior of AZ91D Magnesium Alloy"; J. Mater. Res.; 20(10); pp. 2763-2771;(2005).
Huo et al.; "Corrosion of AZ91D Magnesium Alloy with a Chemical Conversion Coating and Electroless Nickel Layer"; Corrosion Science: 46; pp. 1467-1477; (2004).
International Search Report and Written Opinion; International Application No. PCT/US2010/057763; International Filing Date: Nov. 23, 2010; Date of Mailing: Jul. 28, 2011; 10 pages.
International Search Report and Written Opinion; International Application No. PCT/US2010/059268; International Filing Date: Dec. 7, 2010; Date of Mailing: Jul. 27, 2011; 8 pages.
International Search Report and Written Opinion; International Application No. PCT/US2010/059268; International Filing Date: Dec. 7, 2010; Date of Mailing: Jul. 8, 2011; 9 pages.
International Search Report and Written Opinion; International Application No. PCT/US2010/059268; International Filing Date: Dec. 7, 2010; Date of Mailing: Jun. 17, 2011; 8 pages.
International Search Report and Written Opinion; International Application No. PCT/US2011/043036; International Filing Date: Jul. 6, 2011; Date of Mailing: Feb. 23, 2012; 9 pages.
International Search Report and Written Opinion; International Application No. PCT/US2011/047000; International Filing Date: Aug. 9, 2011; Date of Mailing: Dec. 26, 2011; 8 pages.
International Search Report and Written Opinion; International Application No. PCT/US2011/058099; International Filing Date: Oct. 27, 2011; Date of Mailing: May 11, 2012; 12 pages.
International Search Report and Written Opinion; International Application No. PCT/US2011/058105; International Filing Date: Oct. 27, 2011; Date of Mailing: May 1, 2012; 8 pages.
International Search Report and Written Opinion; International Application No. PCT/US2012/034978; International Filing Date: Apr. 25, 2012; Date of Mailing: Nov. 12, 2012; 9 pages.
International Search Report and Written Opinion; International Application No. PCT/US2012/046231; International Filing Date: Jul. 11, 2012; Date of Mailing: Jan. 29, 2013; 9 pages.
International Search Report and Written Opinion; International Application No. PCT/US2012/053339; International Filing Date: Aug. 31, 2012; Date of Mailing: Feb. 15, 2013; 11 pages.
International Search Report and Written Opinion; International Application No. PCT/US2012/071742; International Filing Date: Dec. 27, 2012; Date of Mailing: Apr. 22, 2013; 12 pages.
Lavernia, et al., "Cryomilled Nanostructured Materials: Processing and Properties", Materials Science and Engineering A, 493, (2008) pp. 207-214.
Li, "Design of Abrasive Water Jet Perforation and Hydraulic Fracturing Tool," Oil Field Equipment, Mar. 2011.
Lunder et al.; "The Role of Mg17Al12 Phase in the Corrosion of Mg Alloy AZ91"; Corrosion; 45(9); pp. 741-748; (1989).
Maisano, "Cryomilling of Aluminum-Based and Magnesium-Based Metal Powders", Thesis, Virginia Tech, Jan. 13, 2006.
Murray, "Binary Alloy Phase Diagrams" Int. Met. Rev., 30(5) 1985 vol. 1, pp. 103-187.
Nie, "Patents of Methods to Prepare Intermetallic Matrix Composites: A Review", Recent Patents on Materials Science 2008, vol. 1, pp. 232-240.
Seyni, et al., "On the interest of using degradable fillers in co-ground composite materials", Powder Technology 190, (2009) pp. 176-184.

(56) References Cited

OTHER PUBLICATIONS

Vahlas, et al., "Principles and Applications of CVD Powder Technology", Materials Science and Engineering R 53 (2006) pp. 1-72.

Zhan, et al., "Single-wall carbon nanotubes as attractive toughening agents in alumina-based nanocomposites" Nature Materials, vol. 2., Jan. 2003, pp. 38-42.

Australian Examination Report; Australian Application No. 2012287461; Date of Mailing: Jul. 13, 2015; 6 pages.

Chinese Office Action for Chinese Application No. 201280036477.4, dated Nov. 4, 2015, pp. 1-15.

Chinese Office Action; Chinese Application No. 201280020572.5; Mailing Date:Oct. 10, 2015; 13 pages.

Chuan-Jun et al., "Study on Corrosion Kinetics of Mg—Ni alloys", Journal of Kunming University of Science and Technology, vol. 34, No. 5, pp. 10-13, Oct. 2009.

Reid, Gary Carl, "Literature evaluation of induced groundwater tracers, field tracer techniques, and hydrodynamic dispersion values in porous media", Theisis in Geosciences (Masters), Texas Tech University, Aug. 1981, 109 pages.

"Declaration of Karl T. Hartwig in Support of Petitioner Pursuant to 37 C.F.R. § 42.120", executed on Nov. 21, 2016 in support of U.S. Pat. No. 8,573,295, 52 pages.

"Declaration of Karl T. Hartwig in Support of Petitioner Pursuant to 37 C.F.R. § 42.120", executed on Nov. 21, 2016 in support of U.S. Pat. No. 9,101,978, 51 pages.

Callister, Jr., William D., Materials Science and Engineering an Introduction, Seventh Edition, 2006, pp. 111, 627, and G7.

German, Randall M., Powder Metallurgy Science, Second Edition, 1994, 102 pages.

Klar, Erhard, ASM Handbook: International Metals Handbook—Powder Metallurgy, vol. 7, 1997, pp. 14, 276, and 798.

Petition for INTER PARTES Review; Case No. IPR2017-00326; U.S. Pat. No. 9,101,978; Nov. 23, 2016; 46 pages.

Petition for INTER PARTES Review; Case No. IPR2017-00327; U.S. Pat. No. 8,573,295; Nov. 23, 2016; 53 pages.

Schaffer, James P. et al., The Science and Design of Engineering Materials, Second Edition, 1999, pp. 122, 123, 698, and 699.

Xie, Guoqiang et al., "TEM Observation of Interfaces between Particles in Al-Mg Alloy Powder Compacts Prepared by Pulse Electric Current Sintering", Materials Transactions, 2002, pp. 2177-2180, vol. 43-No. 9.

\* cited by examiner

METHOD TO GENERATE AND DISPERSE NANOSTRUCTURES IN A COMPOSITE MATERIAL

BACKGROUND

Dispersal of reinforcing nanostructures in a matrix material to form a composite material is an emerging technology. Potential improvements in the material properties and performance of the composite material over the matrix material due to addition of reinforcing nanostructures offer an attractive route to robust articles used in downhole industries including oil and natural gas, $CO_2$ sequestration, etc.

To achieve enhanced mechanical properties offered by addition of reinforcing nanostructures, substantially even dispersal of the reinforcing nanostructures within the composite material is required. However, full and even dispersion of nanostructures with high wettability in a matrix material is often difficult and expensive. Moreover, clustering and non-uniform dispersion of reinforcing nanostructures causes variation in mechanical properties of the resulting composite material, which can produce regions of weakness and anisotropic character in properties such as elasticity, strength, thermal conductivity, and thermal expansion coefficient.

There accordingly remains a need for evenly dispersing nanostructures within a matrix material and formation of a composite material therefrom.

SUMMARY

In an embodiment, a method of making a composite powder is disclosed. The method comprises providing matrix particles in a reactor; fluidizing the matrix particles; introducing a nanostructure material into the reactor; homogeneously dispersing the nanostructure material; and uniformly depositing the nanostructure material on the matrix particles to form the composite powder.

In another embodiment, a method of making a nanostructure-reinforced composite comprises providing matrix particles in a reactor; fluidizing the matrix particles; introducing a nanostructure material into the reactor; homogeneously dispersing the nanostructure material; uniformly depositing the nanostructure material on the matrix particles to form a composite powder; generating a nanostructure on the matrix particles from the nanostructure material; and processing the composite powder to form the nanostructure-reinforced composite having a matrix formed from the matrix particles, wherein the nanostructures are evenly distributed in the matrix of the nanostructure-reinforced composite.

BRIEF DESCRIPTION OF THE DRAWINGS

Referring now to the drawings, wherein like elements are numbered alike in the several Figures.

DETAILED DESCRIPTION

Disclosed herein is a method to generate and disperse nanostructures in a matrix material useful for production of a nanostructure-reinforced composite. The homogeneous dispersion of nanostructures within the matrix material provides enhanced material properties as compared with the native matrix material alone. Because of the mechanical strength and associated properties of nanostructures, small amounts of nanostructures disposed in the matrix are sufficient to provide enhanced durability and wear resistance in the nanostructure-reinforced composite. Furthermore, the inventors have found that the homogeneity of the dispersion of the nanostructures within the matrix formed in the method disclosed herein leads to a surprisingly strong and resilient nanostructure-reinforced composite.

The nanostructure-reinforced composite includes a matrix with nanostructures dispersed with a high degree of homogeneity throughout the matrix. In order to obtain homogeneous dispersion of the nanostructures, matrix particles are combined with a nanostructure material that respectively form the matrix and nanostructures in the nanostructure-reinforced composite.

In an embodiment, matrix particles are provided in a reactor and fluidized therein. Nanostructure material is also introduced into the reactor. Due to the relative motion of the matrix particles and the nanostructure material, the nanostructure material is homogeneously dispersed among the matrix particles. The matrix particles and nanostructure material contact each other, and the nanostructure material deposits on the matrix particles. That is, the nanostructure material adsorbs onto the surface of the matrix particles. The adsorption can be, for example, physisorption or chemisorption. Further, the nanostructure material is uniformly deposited on the matrix particles to form a composite powder.

In an embodiment, the composite powder is removed from the reactor and further processed to form a nanostructure-reinforced composite having a matrix formed from the matrix particles. In the nanostructure-reinforced composite, nanostructures are evenly distributed in the matrix. The nanostructures are generated on the matrix particles either in the reactor or during processing of the composite powder.

In an embodiment, the nanostructures on the surface of the matrix particles are generated from the nanostructure material. Although details of the nanostructure material are given below, in brief, the nanostructure material is either a nanostructure or a material that can form a nanostructure. Therefore, in an embodiment, the nanostructure material is a precursor to a nanostructure, and the nanostructure material either transforms (physically or chemically) into a nanostructure as it deposits or after being deposited on the matrix particles. Alternatively, the nanostructure material is introduced into the reactor as a nanostructure so that nanostructures are deposited on the matrix particles without affecting a physical or chemical transformation of the nanostructure material into a nanostructure.

The superior mechanical properties of the nanostructure-reinforced composite depend on the homogeneous dispersion of the nanostructures in the matrix. To afford these properties, in an embodiment, the nanostructure material is homogeneously dispersed in the reactor with the matrix particles prior to processing the composite powder. In an embodiment, the reactor is a fluidized bed reactor. Particularly, the matrix particles are provided to the fluidized bed reactor prior to the introduction of the nanostructure material. In this case, the matrix particles are fluidized by the passage of a fluid through the fluidized bed reactor. Then, the nanostructure material is introduced into the fluidized bed reactor. In another embodiment, the nanostructure material is included in the fluid. In an alternative embodiment, the nanostructure material is introduced into the fluidized bed reactor either before or simultaneously with the matrix particles.

Due to the fluid-like behavior of the solid matrix particles in the fluidized bed reactor, the matrix particles completely mix with the nanostructure material, eliminating radial and axial concentration gradients in the reactor and allowing for contact of the nanostructure material and matrix particles. As a result of the mixing efficiency of the fluidized bed reactor, the nanostructure material is homogeneously dispersed with the matrix particles and uniformly deposited onto the matrix particles. In an embodiment, the nanostructure material can be introduced into the fluidized bed reactor and deposited onto the matrix particles by a physical or chemical process such as physical vapor deposition or chemical vapor deposition.

The amount of the matrix particles and the nanostructure material in the reactor can be determined based on the desired property of the nanostructure-reinforced composite. In an embodiment, the ratio of the weight of the nanostructure material to the weight of the matrix particles is about 1:500,000 to about 1:1, more specifically 1:100,000, even more specifically about 1:1000, and yet even more specifically 1:10. According to another embodiment, the amount of the nanostructure material on the matrix particles is about 0.001 wt. % to about 50 wt. %, particularly about 0.01 wt. % to about 10 wt. %, and particularly about 0.01 wt % to about 1 wt. %, based on the weight of the composite powder.

The reaction time in the reactor can vary from about 5 minutes to about 1 week, more specifically about 30 minutes to 12 hours, and even more specifically about 0.5 hour to about 6 hours. In an embodiment, the pressure and temperature is each set to a value effective for disposal of the nanostructure material on the matrix particles and depends on the chemical makeup of the matrix particles. The temperature can be about 20° C. to about 450° C. In an embodiment, the environmental parameters (for example, chemical, temperature, pressure, and the like) inside the reactor allow for deposition of the nanostructure material while maintaining the integrity and composition of the matrix particles. The fluid used in the reactor can be, for example, a gas, liquid, or a combination thereof.

According to an embodiment, the matrix particles can be coated with one or more layers of nanostructure material. Further, in the case of a multilayer coating of nanostructure material on the matrix particles, the layers can have different compositions from each other. In an embodiment, the matrix particle is coated with three layers formed by introducing the matrix particles into the reactor followed by entraining a first nanostructure material in a carrier gas, dispersing the first nanostructure material, and coating the first nanostructure material on the matrix particles to form a first layer. Subsequently, a second nanostructure material is introduced into the reactor by entraining it in a carrier gas, dispersing the second nanostructure material, and disposing the second nanostructure material on the first layer to form a second layer. Then, a third nanostructure material is introduced into the reactor by entraining it in a carrier gas, dispersing the third nanostructure material, and disposing the third nanostructure material on the second layer to form a third layer.

The thickness of the nanostructure material coating on the matrix particles can be about 30 nanometers (nm) to about 5000 nm. Moreover, for a multilayer coating of nanostructure material on the matrix particles, each layer may have a thickness of about 30 nm to about 1000 nm.

The carrier gas can be inert with respect to reactivity inside the reactor, for example, nitrogen, argon, and the like. Alternatively, the carrier gas can be an oxidizing or oxide forming gas, such as oxygen. As a further alternative, the carrier gas can be a gas mixture of the foregoing gases.

In an embodiment, the nanostructure material is a solid, liquid, or gas. The introduction of the nanostructure material into the reactor can be via flow of carrier gas or any other means known in the art.

Depending on the composition of the matrix particles (which are described more fully below), processing the composite powder includes physical and/or chemical processing of the composite powder. Processing the composite powder forms the matrix from the matrix particles. Further, nanostructures can be formed from the nanostructure material on the surface of the matrix particles during processing the composite powder, particularly when the nanostructures were not formed in the reactor.

An example of processing includes mechanical deformation of the composite powder such as by mechanical alloying. Mechanical alloying can be performed by repeated physical impact on the composite powder. In an embodiment, the composite powder is transferred from the reactor to a ball mill so that balls (for example, metallic or ceramic balls) mechanically impact the composite powder. In particular, mechanical alloying can be performed using a vibratory ball mill, rotary ball mill, planetary ball mill, or attrition mill, but is not limited thereto. It will be understood that the nanostructure material is homogeneously dispersed and disposed on the matrix particles in the reactor prior to processing by mechanical deformation such as mechanical alloying. Due to the strength of the nanostructures on the matrix particles, the nanostructures incur substantially no damage during mechanical alloying. In a further embodiment, nanostructures are generated from the nanostructure material during mechanical alloying. Also, as a result of processing metals or ceramics in particular (in the matrix particles, nanostructure materials, or both), fine grain structures and grain boundaries can form. The composition and phases of the grain structures is determined by the temperature and pressure used during processing.

During mechanical alloying, the matrix particles can fragment into smaller particles. However, the nanostructure material remains fully dispersed such that the nanostructure material does not agglomerate or cluster. That is, mechanical alloying does not reduce the high degree of dispersion of the nanostructure material.

In an embodiment, the temperature during ball milling is regulated from about cryogenic temperatures (for example, 77 K) to about ambient temperature (about 300 K). According to an embodiment, for matrix particles containing polymer material, ball milling can be performed at about the temperature of liquid nitrogen in a process such as cryomilling.

In an embodiment, additional nanostructure material (including nanostructures) is added to the composite powder during mechanical alloying. Furthermore, the milling rate (for example, the angular frequency of the rotary ball mill) can be controlled to vary the force and amount of impacts of the composite powder with balls in the mill. In this way, deformation of the composite powder and physical and chemical changes to the composite powder can be regulated.

Depending on the chemical composition of the matrix (for example, a matrix formed from polymeric, metallic, or ceramic matrix particles), further processing can follow the mechanical alloying. After the mechanical alloying, the composite powder can be placed in a mold and sintered to form the nanostructure-reinforced composite. The term "sintering" as used herein means densification of a particulate component (for example, the matrix particles) involving removal of at least a portion of the pores between the particles combined with coalescence and bonding between adjacent matrix particles.

Alternatively, spark plasma sintering can be performed by placing the mechanically alloyed composite powder in a mold, establishing a vacuum in a chamber containing the mold using a vacuum pump, introducing gas (for example, argon, hydrogen, or oxygen, and the like) into the chamber to apply pressure to the mold, and treating the composite powder with plasma in a plasma zone formed in the central portion of the mold. Since the spark plasma sintering rapidly sinters, the nanostructure-reinforced composite having high mechanical strength can be prepared.

For spark plasma sintering, if the pressure in the chamber is too high or too low during the plasma process, it is difficult to generate plasma or perform a plasma treatment. Thus, the pressure in the chamber can be from about 50 megapascals (MPa) to about 100 MPa, particularly about 60 MPa to about 90 MPa. Additionally, if the plasma treatment time is too short or the heating rate is too low, it is difficult to sufficiently perform the plasma treatment. Therefore, the plasma treatment can be performed at a temperature of about 150° C. to about 700° C. and at a heating rate of about 25° C. per minute (° C./min) to about 75° C./min for about 1 minute to about 30 minutes.

According to another embodiment, the composite powder is subjected to hot isostatic pressing or cold isostatic pressing. In another embodiment, particularly when the matrix particles include a polymer, the composite powder is molded and optionally cured. In a further embodiment, the composite powder is extruded.

Processing the composite powder results in the formation of the nanostructure-reinforced composite whereby the matrix particles form the matrix, and nanostructures are uniformly dispersed throughout the matrix. It will be appreciated that, in processing the composite powder, the matrix and nanostructures form a monolith with substantially all of the matrix particles being integrated into the matrix. In addition, any of the foregoing processing methods of the composite powder may be used in combination.

The nanostructure-reinforced composite is useful for preparing elements for applications in oil and natural gas industries. Exemplary elements include a packer element, a blow out preventer element, a submersible pump motor protector bag, a sensor protector, a sucker rod, a production tubing, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, a plug, a valve, a connector, a filter, a latch, or other downhole elements.

The matrix particles are mechanically deformable and/or pulverizable and have an initial average particle size from about 0.1 μm to about 500 μm, in an embodiment 0.5 μm to about 250 μm. The shape of the matrix particles may be regular or irregular. In an embodiment, the matrix particles may be, for example, spherical or oblong. The matrix particles can be any material that allows for deposition of the nanostructure material and formation of nanostructures on the surface of the matrix particles. In an embodiment, the matrix particles are a metal, metal oxide, metal carbide, polymer, ceramic, plastic, glass, graphene, graphite, or a combination thereof.

Metals include, for example, magnesium, aluminum, titanium, manganese, iron, cobalt, nickel, copper, molybdenum, tungsten, palladium, chromium, ruthenium, gold, silver, zinc, zirconium, vanadium, silicon, or a combination thereof, including alloys thereof. Particularly, the metal can be an aluminum-based alloy, magnesium-based alloy, tungsten-based alloy, cobalt-based alloy, iron-based alloy, nickel-based alloy, cobalt and nickel-based alloy, iron and nickel-based alloy, iron and cobalt-based alloy, copper-based alloy, and titanium-based alloy. As used herein, the term "metal-based alloy" means a metal alloy wherein the weight percentage of the specified metal in the alloy is greater than the weight percentage of any other component of the alloy, based on the total weight of the alloy. Exemplary metal alloys include MgZrZn, MgAlZn, AlCuZnMn, and AlMgZnSiMn.

Further, the metal oxides and metal carbides include the metals listed above. Exemplary metal oxides and metal carbides include aluminum oxide ($Al_2O_3$), magnesium oxide, and tungsten carbide, The polymer can be a homopolymer or copolymer and can be linear or branched. Further the copolymer can be a random copolymer, alternating copolymer, block copolymer, or graft copolymer. In an embodiment, the polymer is a polyphenylene, polyacetylene, polypyrrole, polythiophene, polyester, polyethylene, polyacrylate, polypropylene, polyamide, polyimide, polybenzoxazole, poly(amino acid), epoxy, polystyrene, polybutadiene, polycarbonate, substituted derivative thereof, or copolymer thereof. Exemplary polymers include polyacrylic acid, polyacrylonitrile, poly (methyl methacrylate), polyethylene propylene, polyisopropene, polyphenylene, polyphenylene sulfide, and polyetherketone.

The ceramic is not particularly limited and can be selected depending on the particular application of the nanostructure-reinforced composite. Examples of the ceramic include an oxide-based ceramic, nitride-based ceramic, carbide-based ceramic, boride-based ceramic, silicide-based ceramic, or a combination thereof. In an embodiment the oxide-based ceramic is silica ($SiO_2$) or titania ($TiO_2$). The oxide-based ceramic, nitride-based ceramic, carbide-based ceramic, boride-based ceramic, or silicide-based ceramic can contain a nonmetal such as oxygen, nitrogen, boron, carbon, or silicon; a metal such as aluminum, lead, or bismuth; a transition metal such as niobium, tungsten, titanium, zirconium, hafnium, or yttrium; an alkali metal such as lithium or potassium; an alkaline earth metal such as calcium, magnesium, or strontium; a rare earth such as lanthanum or cerium; and a halogen such as fluorine or chlorine.

The nanostructure material is a nanostructure or a nanostructure precursor, which can form a nanostructure on the surface of the matrix particles. Adjusting the temperature and pressure of the reactor in relation to chemical and physical properties of the matrix particles and nanostructure material allows for generation of nanostructures on the surface of the matrix particles.

Nanostructures are generally particles having an average particle size, in at least one dimension, of less than one micrometer (μm). As used herein "average particle size" refers to the number average particle size based on the largest linear dimension of the nanostructure (sometimes referred to as "diameter"). Particle size, including average, maximum, and minimum particle sizes, can be determined by an appropriate method of sizing particles such as, for example, static or dynamic light scattering (SLS or DLS) using a laser light source. Nanostructures include both particles having an average particle size of 250 nanometers (nm) or less, and particles having an average particle size of greater than 250 nm to less than 1 μm (sometimes referred in the art as "sub-micron sized" particles). In an embodiment, a nanostructure has an average particle size of about 0.01 to about 500 nm, in another embodiment, 0.05 to 250 nm, in another embodiment, about 0.1 to about 150 nm, and in another embodiment about 1 to about 75 nm. The nanostructures are monodisperse, where all particles are of the same size with little variation, or polydisperse, where the particles have a range of sizes and are averaged. Generally, polydisperse nanostructures are used. In another embodiment, nanostructures of different average particle sizes are used, and in this way, the particle size distribution of the nanostructures is unimodal (exhibiting a single distribution), bimodal exhibiting two distributions, or multi-modal, exhibiting more than one particle size distribution.

The minimum particle size for the smallest 5% of the nanostructures is less than 0.05 nm, in an embodiment less than or equal to 0.02 nm, and in another embodiment less than or equal to 0.01 nm. Similarly, the maximum particle size for 95% of the nanostructures is greater than or equal to 900 nm, in an embodiment greater than or equal to 750 nm, and in another embodiment greater than or equal to 500 nm.

The nanostructures have a high surface area of greater than 180 m$^2$/g, in an embodiment, 300 m$^2$/g to 1800 m$^2$/g, and in another embodiment 500 m$^2$/g to 1500 m$^2$/g.

Examples of the nanostructure material includes nanoparticles, nanotubes, fullerenes, nanowires, nanodots, nanorods, sheets, graphene including nanographene and graphene fiber, nanographite, C1-C4 alkane, C1-C4 alkene, C1-C4 alkyne, benzene, metal, metal oxide, nanodiamonds, polysilsesquioxanes, inorganic nanoparticles including silica nanoparticles, nanoclays, metal nanoparticles, or combinations comprising at least one of the foregoing.

In an embodiment, the nanostructure material is a nanostructure precursor such as a carbon-containing gas or liquid. The gas or liquid deposits on the matrix particle and forms a nanostructure under reactive conditions. Examples of the gas or liquid are methane, ethane, ethylene, acetylene, propane, butane, butene, butadiene, pentane, pentene, hexanes, cyclohexane, benzene, or a combination thereof.

Fullerenes, as disclosed herein, include any of the known cage-like hollow allotropic forms of carbon possessing a polyhedral structure. Fullerenes include, for example, those having from about 20 to about 100 carbon atoms. For example, C$_{60}$ is a fullerene having 60 carbon atoms and D$_{5h}$ symmetry and is a commercially available fullerene. Exemplary fullerenes include C$_{30}$, C$_{32}$, C$_{34}$, C$_{38}$, C$_{40}$, C$_{42}$, C$_{44}$, C$_{46}$, C$_{48}$, C$_{50}$, C$_{52}$, C$_{60}$, C$_{70}$, C$_{76}$, and the like.

Nanotubes include carbon nanotubes, inorganic nanotubes (e.g., boron nitride nanotubes), metallated nanotubes, or a combination comprising at least one of the foregoing. Nanotubes are tubular fullerene structures having open or closed ends and which are inorganic (e.g., boron nitride) or made entirely or partially of carbon. In an embodiment, carbon and inorganic nanotubes include additional components such as metals or metalloids, which are incorporated into the structure of the nanotube, included as a dopant, form a surface coating, or a combination comprising at least one of the foregoing. Nanotubes, including carbon and inorganic nanotubes, are single walled nanotubes (SWNTs) or multi-walled nanotubes (MWNTs).

Nanographite is a cluster of plate-like sheets of graphite, in which a stacked structure of one or more layers of graphite, which has a plate-like two-dimensional structure of fused hexagonal rings with an extended delocalized π-electron system, are layered and weakly bonded to one another. Nanographite has both micro- and nano-scale dimensions, such as for example an average particle size of 1 to 20 μm, in an embodiment 1 to 15 μm, and an average thickness (smallest) dimension in nano-scale dimensions, and an average thickness of less than 1 μm, in an embodiment less than or equal to 700 nm, and in another embodiment less than or equal to 500 nm.

In an embodiment, the nanostructure is graphene including nanographene and graphene fibers (i.e., graphene particles having an average largest dimension of greater than 1 μm, a second dimension of less than 1 μm, and an aspect ratio of greater than 10, where the graphene particles form an inter-bonded chain). Graphene and nanographene, as disclosed herein, are effectively two-dimensional particles of nominal thickness, having of one, or more than one layers of fused hexagonal rings with an extended delocalized π-electron system; as with nanographite, where more than one graphene layer is present, the layers are weakly bonded to one another through π-π stacking interaction. Graphene in general, and including nanographene (with an average particle size of less than 1 μm), is thus a single sheet or a stack of several sheets having both micro- and nano-scale dimensions. In some embodiments, graphene has an average particle size of 1 to 20 μm, in another embodiment 1 to 15 μm, and an average thickness (smallest) dimension in nano-scale dimensions of less than or equal to 50 nm, in an embodiment less than or equal to 25 nm, and in another embodiment less than or equal to 10 nm. An exemplary graphene has an average particle size of 1 to 5 μm, and in an embodiment 2 to 4 μm. In another embodiment, smaller nanoparticles or sub-micron sized particles as defined above are combined with nanoparticles having an average particle size of greater than or equal to 1 μm. In a specific embodiment, the nanostructure is a derivatized graphene.

Graphene, including nanographene, is prepared by, for example, exfoliation of nanographite or by a synthetic procedure by "unzipping" a nanotube to form a nanographene ribbon, followed by derivatization of the nanographene to prepare nanographene oxide.

Exfoliation to form graphene or nanographene is carried out by exfoliation of a graphite source such as graphite, intercalated graphite, and nanographite. Exemplary exfoliation methods include, but are not limited to, those practiced in the art such as fluorination, acid intercalation, acid intercalation followed by high temperature treatment, and the like, or a combination comprising at least one of the foregoing. Exfoliation of the nanographite provides a nanographene having fewer layers than non-exfoliated nanographite. It will be appreciated that exfoliation of nanographite may provide the nanographene as a single sheet only one molecule thick, or as a layered stack of relatively few sheets. In an embodiment, exfoliated nanographene has fewer than 50 single sheet layers, in an embodiment fewer than 20 single sheet layers, in another embodiment fewer than 10 single sheet layers, and in another embodiment fewer than 5 single sheet layers.

A nanodiamond is a diamond particle having an average particle size of less than 1 μm. Nanodiamonds are from a naturally occurring source, such as a by-product of milling or other processing of natural diamonds, or are synthetic, prepared by any suitable commercial method. Nanodiamonds are used as received, or are sorted and cleaned by various methods to remove contaminants and non-diamond carbon phases present, such as residues of amorphous carbon or graphite.

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, may be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

Nanoclays are hydrated or anhydrous silicate minerals with a layered structure and include, for example, aluminosilicate clays such as kaolins including halloysite, smectites including montmorillonite, illite, and the like. Exemplary nanoclays include those marketed under the tradename CLOISITE® marketed by Southern Clay Additives, Inc. Nanoclays are exfoliated to separate individual sheets, or are non-exfoliated, and further, are dehydrated or included as hydrated minerals. Other nano-sized mineral fillers of similar structure are also included such as, for example, talc, micas including muscovite, phlogopite, or phengite, or the like.

Inorganic nanoparticles include a metal or metalloid oxide such as silica, alumina, titania, tungsten oxide, iron oxides, combinations thereof, or the like; a metal or metalloid carbide such as tungsten carbide, silicon carbide, boron carbide, or the like; a metal or metalloid nitride such as titanium nitride, boron nitride, silicon nitride, or the like; or a combination comprising at least one of the foregoing.

Metal nanoparticles include those made from metals such as aluminum, iron, tin, titanium, platinum, palladium, cobalt, nickel, tungsten, zinc, zirconium, silicon, vanadium, alloys thereof, or a combination comprising at least one of the foregoing. In other embodiments, inorganic nanoparticles include those coated with one or more layers of metals such as iron, tin, titanium, platinum, palladium, cobalt, nickel, vanadium, alloys thereof, or a combination comprising at least one of the foregoing.

Nanostructures in general can be derivatized to include a variety of different functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, and the like. In an embodiment, the nanoparticle is functionalized to include a hydrophilic functional group including hydroxy, carboxylic acid, amine, lactone, polyethylene glycol, a hydrophilic polymer, ionic groups such as ammonium groups and/or carboxylate salt groups, or a combination comprising at least one of the foregoing. In another embodiment, nanostructures include a combination of derivatized nanostructures and underivatized nanostructures.

As described above, using a fluidized bed reactor to disperse the matrix particles and nanostructure material allows for full and even dispersion of the nanostructure material. Moreover, clustering and non-uniform dispersion of nanostructures in the nanostructure-reinforced composite is substantially diminished. Hence, the resulting composite material has uniform mechanical properties, including elasticity, strength, thermal conductivity, and thermal expansion coefficient.

The above embodiments are further demonstrated in the following example, which is intended as illustrative only and is not intended to be limited thereto.

Coating of Magnesium Matrix Particles. Magnesium granules were placed in a fluidized bed reactor. Triethyl aluminum ($(C_2H_5)_3Al$) was entrained in a flow of nitrogen carrier gas. The gas mixture was introduced into the fluidized bed reactor. The aluminum was fully dispersed in the reactor among the magnesium granules. The magnesium granules were coated with the aluminum to dispose an aluminum layer on the magnesium granules. Air was then injected into the carrier gas. Oxygen from the air reacted with the aluminum in the carrier gas so that aluminum oxide ($Al_2O_3$) entered the reactor. The aluminum oxide was fully dispersed in the reactor among the aluminum coated magnesium granules. The aluminum oxide then coated the aluminum layer on the magnesium granules to dispose an aluminum oxide layer. Subsequently, the air to the gas mixture was terminated so that the gas mixture no longer contained oxygen. Consequently, aluminum was introduced and fully dispersed inside the reactor to dispose a layer of aluminum on the aluminum oxide layer. As a result, the magnesium granules were uniformly coated with three layers in the following order: aluminum, aluminum oxide, and aluminum.

Figure 1:
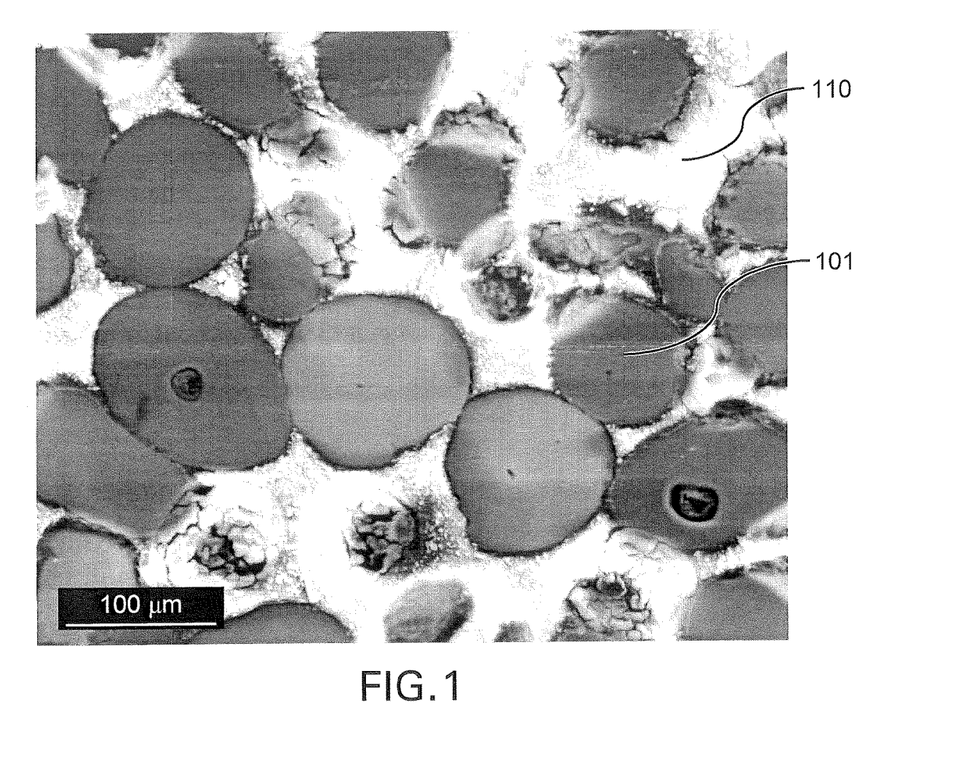
FIG. 1 shows a scanning electron microscope image of matrix particles without a nanostructure material coating.

FIG. 1 shows a scanning electron microscope (SEM) image of the magnesium granules before coating. The magnesium particles 101 were mounted in an epoxy substrate 110 and cross-sectioned to obtain the image. It is to be noted that the magnesium granules 101, coated or uncoated, do not contain the epoxy substrate material used solely for the purposes of obtaining the SEM image.

Figure 2A:
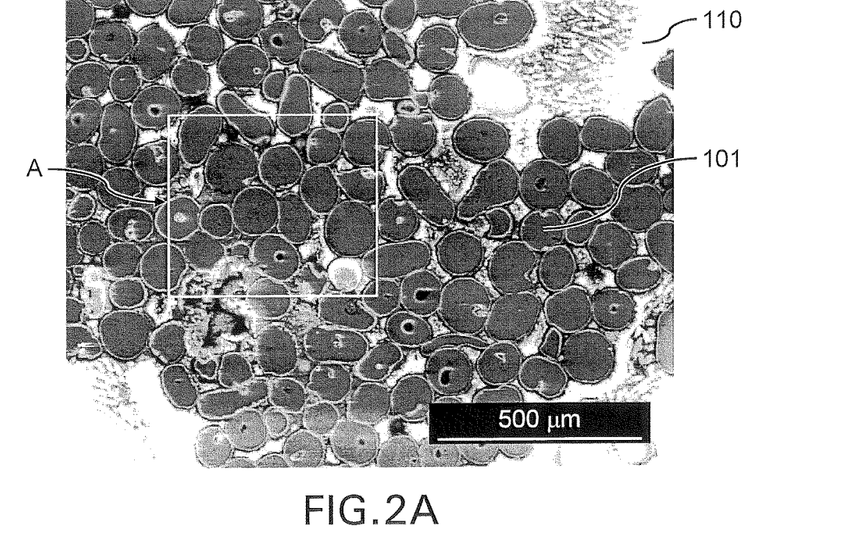
FIGS. 2A and 2B show scanning electron microscope images of matrix particles with a nanostructure material coating.
Figure 2B:
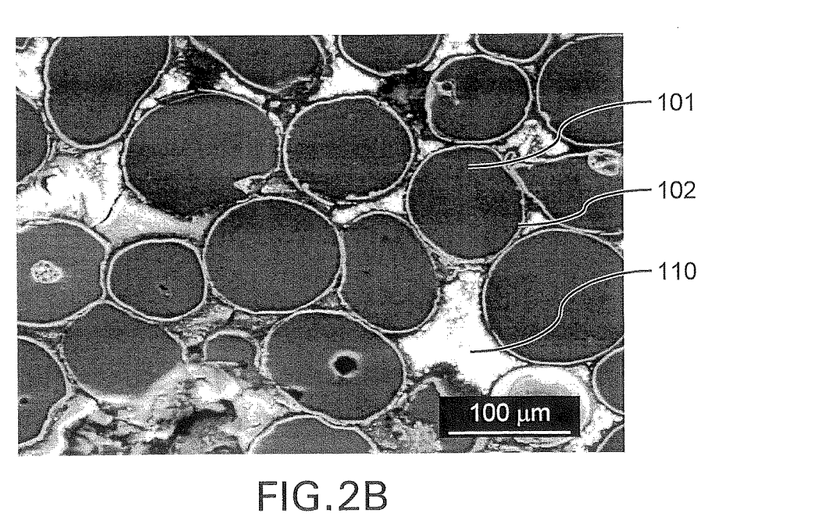

FIGS. 2A and 2B show scanning electron microscope images of the magnesium granules after coating with the layers of nanostructure material as described above. FIG. 2B is an enlarged view of portion A of FIG. 2A. Unlike the magnesium granules 101 shown in FIG. 1, magnesium granules 101 of FIGS. 2A and 2B have a white-colored encapsulation 102, which is the three-layer coating 102 described above. The coating 102 is aluminum/aluminum oxide/aluminum.

The coating 102 was evenly deposited on the magnesium granules 101 with greater than 95% surface coverage of the magnesium granules 101. Subsequent processing of the coated granules by compacting, sintering, or deforming processing created nanostructures from the coating 102.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A method of making a nanostructure-reinforced composite comprising:
    providing matrix particles in a reactor, the matrix particles comprising a metal selected from magnesium, aluminum, titanium, manganese, iron, cobalt, nickel, copper, molybdenum, tungsten, palladium, chromium, ruthenium, gold, silver, zinc, zirconium, vanadium, silicon, or a combination thereof;
    fluidizing the matrix particles;
    introducing a nanostructure material into the reactor;
    homogeneously dispersing the nanostructure material;
    uniformly depositing the nanostructure material on the matrix particles to form a composite powder;
    mechanically alloying the composite powder to generate a nanostructure on the matrix particles from the nanostructure material; and
    processing the composite powder to form the nanostructure-reinforced composite having a matrix formed from the matrix particles,
    wherein the nano structures are evenly distributed in the matrix of the nanostructure-reinforced composite.

2. The method of claim 1, wherein the matrix particles are about 0.5 μm to about 500 μm.

3. The method of claim 1, wherein the amount of the nanostructure material on the matrix particles is about 0.001 wt. % to about 50 wt. % based on the weight of the composite powder.

4. The method of claim 1, wherein uniformly depositing the nanostructure material on the matrix particles is a chemical process.

5. The method of claim 1, wherein uniformly depositing the nanostructure material on the matrix particles is a physical process.

6. The method of claim 1, wherein processing the composite powder comprises mechanical alloying, sintering, hot pressing, spark plasma sintering, extrusion, curing, molding, or a combination thereof.

7. The method of claim 1, wherein processing the composite powder comprises
    mechanical alloying the composite powder using a ball mill; and
    sintering the composite powder to form the nanostructure-reinforced composite.

8. The method of claim 1, wherein the nanostructure material comprises nanoparticles, nanotubes, fullerenes, nanowires, nanodots, nanorods, sheets, graphene, nanographite, C1-C4 alkane, C1-C4 alkene, C1-C4 alkyne, benzene, metal, metal oxide, nanodiamonds, polysilsesquioxanes, inorganic nanoparticles, nanoclays, metal nanoparticles, or combinations thereof.

9. The method of claim 1, wherein the matrix particles fragment into smaller particles during mechanical alloying.

10. The method of claim 1, wherein additional nanostructure material is added to the composite powder during mechanical alloying.

11. The method of claim 1, wherein the matrix and nanostructures form a monolith with substantially all of the matrix particles being integrated into the matrix.

* * * * *